(12) United States Patent
Yamada et al.

(10) Patent No.: US 7,948,586 B2
(45) Date of Patent: May 24, 2011

(54) LIQUID CRYSTAL DISPLAY DEVICE AND MANUFACTURING METHOD THEREOF

(75) Inventors: Naoshi Yamada, Tsu (JP); Toshihide Tsubata, Tsu (JP); Hidehiko Yamaguchi, Tsu (JP); Yoshinori Shimada, Taki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 592 days.

(21) Appl. No.: 11/815,783

(22) PCT Filed: Jul. 7, 2006

(86) PCT No.: PCT/JP2006/313612
§ 371 (c)(1),
(2), (4) Date: Aug. 8, 2007

(87) PCT Pub. No.: WO2007/007689
PCT Pub. Date: Jan. 18, 2007

(65) Prior Publication Data
US 2009/0033846 A1    Feb. 5, 2009

(30) Foreign Application Priority Data

Jul. 11, 2005  (JP) ................. 2005-202282

(51) Int. Cl.
G02F 1/1333    (2006.01)
G02F 1/1339    (2006.01)

(52) U.S. Cl. .............. 349/110; 349/138; 349/153

(58) Field of Classification Search .............. 349/138, 349/152–154, 190, 44, 110
See application file for complete search history.

(56) References Cited

U.S. PATENT DOCUMENTS

| | | | |
|---|---|---|---|
| 6,424,394 B1 * | 7/2002 | Morii | |
| 7,333,167 B2 * | 2/2008 | Kawase | 349/106 |
| 7,468,775 B2 * | 12/2008 | Lee et al. | 349/153 |
| 2002/0008815 A1 * | 1/2002 | Hanakawa et al. | 349/113 |
| 2002/0196393 A1 * | 12/2002 | Tashiro et al. | |
| 2003/0218713 A1 * | 11/2003 | Suzuki et al. | |

FOREIGN PATENT DOCUMENTS

JP    2001-083531 A  *  3/2001

OTHER PUBLICATIONS

Official Communication for PCT Application No. PCT/JP2006/313612; mailed on Oct. 3, 2006.

* cited by examiner

*Primary Examiner* — Dung T. Nguyen
(74) *Attorney, Agent, or Firm* — Keating & Bennett, LLP

(57) ABSTRACT

In a liquid crystal display device, an array substrate and a CF substrate are arranged face to face with each other. A liquid crystal layer is provided between the array substrate and the CF substrate. The array substrate and the CF substrate are bonded together by a sealing member containing a photo curing material. The array substrate has a surface opposed to the CF substrate. Metal wires are provided in the circumferential portion of the opposed surface. A transparent film is disposed between the metal wires and the sealing member.

26 Claims, 16 Drawing Sheets

LIQUID CRYSTAL DISPLAY DEVICE AND MANUFACTURING METHOD THEREOF

BACKGROUND OF THE INVENTION

1. Field of the Invention

The present invention relates to a liquid crystal display device and a manufacturing method thereof. Particularly, the present invention relates to a liquid crystal display device using a sealing member containing a photo curing material, and a manufacturing method thereof.

2. Description of the Related Art

Conventionally, liquid crystal display devices have been widely used as substitution for CRTs. The liquid crystal display devices are thinner than the CRTs and can be downsized, so that the liquid crystal display devices are used for mobile terminals such as laptop PCs and mobile phones.

An active matrix type liquid crystal display device of these liquid crystal display devices has been mainly used in recent years. The active matrix type liquid crystal display device is arranged such that an array substrate on which thin film transistors (TFT) are formed in a matrix manner and a CF substrate on which a color filter (CF) and so on are formed are disposed face to face and are bonded together by a thermal curing sealing member provided on the respective circumferential end portions of the substrates. Between the substrates, a liquid crystal having an electro-optic property is provided.

Such a liquid crystal display device is manufactured by bonding the substrates together via the sealing member, injecting the liquid crystal from an opening section provided in a sealing pattern of the sealing member, and sealing the opening section of the sealing pattern thereafter.

However, it takes a long time to inject the liquid crystal upon manufacturing the liquid crystal display device in the manner described above. In view of this, a liquid crystal dropping adhesion method is employed. The liquid crystal dropping adhesion method is a method of injecting a liquid crystal in vacuum by applying a sealing member to the array substrate in the form of a frame along the circumferential ends of the array substrate, dropping the liquid crystal onto the portion surrounded by the sealing member thus applied, and bonding the array substrate and the CF substrate together.

However, in the above method, when the liquid crystal and the sealing member uncured meet, an ingredient of the sealing member is melt into the liquid crystal. This results in occurrence of spots. Further, heat application required in curing the sealing member causes thermal expansion of the array substrate and the CF substrate used herein, with the result that the substrates are displaced from each other. Required accordingly are: (i) fast curing for prevention of the spots, and (ii) a sealing member that is cured without heat application and therefore allows prevention of the displacement. It has been proposed to use a photo curing sealing member instead of the thermal curing sealing member.

FIG. 8 is a plan view illustrating a panel section of a liquid crystal display device using such a photo curing sealing member. FIG. 9 is a cross sectional view schematically illustrating the structure of the liquid crystal display device shown in FIG. 8 and taken along line B-B. The following explains the conventional sealing member used in the liquid crystal display device, with reference to FIG. 8 and FIG. 9.

The panel section of the liquid crystal display device includes a CF substrate 101 and an array substrate 102, between which a liquid crystal 106 is interposed. The CF substrate 101 and the array substrate 102 are bonded together via a photo curing sealing member 103. The CF substrate 101 has a surface which meets the sealing member 103 and on which a light blocking black matrix (hereinafter, referred to as "BM"; light blocking film) 105 is formed. The array substrate 102 has a surface which meets the sealing member 103 and on a part of which metal wires 104 (see FIG. 9) are formed so as to supply a signal to a display area 109. The metal wires 104 are connected to terminal sections 111. The sealing member 103 is provided in a frame region 110 surrounding the display area 109.

When light is irradiated via the array substrate 102 in a manufacturing process of the liquid crystal display device so as to cure the sealing material 103, each of the metal wires 104 shades a portion 103a (see FIG. 9) of the sealing member 103, with the result that the light is unlikely to irradiated onto the portion 103. Accordingly, the sealing member 103 is likely to stay uncured. The light may travel around due to a diffraction effect; however, in this case, the light needs to be irradiated for a long time.

A conceivable way to overcome this shortcoming is to provide an opening section (light transmission section) in the BM 105 (light blocking film) making contact with the photo curing sealing member 103 interposed between the two substrates and to irradiate light via the opening section. Normally, such an opening section can be formed in a part of the BM 105 (light blocking film) as long as the formation of the opening section has no adverse effect on input/output signals of the frame region 110.

For example, Patent Document 1 (Japanese Unexamined Patent Publication Tokukai 2000-89235 (published on Mar. 31, 2000) corresponding to U.S. Pat. No. 6,424,394 (registered on Jul. 23, 2002)) proposes that the shape of the light blocking film provided just above or just below the photo curing sealing member, the width thereof, and the size of the opening section provided in the light blocking film are defined such that the photo curing sealing member is irradiated with light necessary for curing the photo curing sealing member.

Another conceivable way to overcome the aforesaid shortcoming is to use a light blocking layer in which a blue-colored layer, a red-colored layer, and a green-colored layer are provided on top of one another, instead of using the BM 105 provided on the CF substrate 101.

For example, Patent Document 2 proposes to use the light blocking layer such that the blue-colored layer is in contact with the sealing member and to use as the sealing member a resin material reactive to light having a wavelength falling within the blue band. Specifically, Patent Document 2 (Japanese Unexamined Patent Publication Tokukai 2001-222017 (Published on Aug. 17, 2001) corresponding to US Unexamined Patent Publication 2002/0196393 (published on Dec. 26, 2002)) proposes to cure the sealing member by light irradiated via the CF substrate so as to pass through the blue-colored layer and therefore having a wavelength falling within the blue band.

Meanwhile, Patent Document 3 (Japanese Unexamined Patent Publication Tokukai 2004-4563 (published on Jan. 8, 2004) corresponding to US Unexamined Patent Publication 2003/0218713 (published on Nov. 27, 2003)) proposes to cure the sealing member by irradiating light obliquely with respect to the substrate surface of the CF substrate such that the light having passed through the CF substrate is reflected by the array substrate, the BM, and the metal wires and therefore reaches the overlapping region of the sealing member with each of the metal wires.

However, even when the method described in Patent Document 1 is used, it is still difficult to cure the portion 103a (see FIG. 9) shaded by each of the metal wires 104 as compared with portions other than the portion 103a, as long as the light is irradiated from the metal wire 104 side so as to cure the sealing member 103. On the other hand, in the methods described in Patent Documents 2 and 3, designing of the liquid crystal panel and the way of irradiating the light are complicated and light utilization efficiency is not good.

Accordingly, demands arise in (i) a liquid crystal display device manufacturing method which prevents spots from appearing due to poor curing of a sealing member, and (ii) the liquid crystal display device in which the problem of the spots appearing due to the poor curing of the sealing member is solved.

SUMMARY OF THE INVENTION

In order to overcome the problems described above, preferred embodiments of the present invention provide a liquid crystal display device in which the problem of spots appearing due to poor curing of a sealing member is solved, and a manufacturing method thereof.

A liquid crystal display device according to a preferred embodiment of the present invention includes: a first substrate and a second substrate, provided face to face with each other; and a liquid crystal layer provided between the first substrate and the second substrate, the first substrate and the second substrate being bonded together by a sealing member containing a photo curing material (a), a light blocking section (A) being provided in a part of an opposed surface of the first substrate to the second substrate, a transparent film being provided between the sealing member and the light blocking section (A).

When light is irradiated via the backside surface of the first substrate so as to cure the sealing member, the light blocking section normally blocks the light, with the result that a light-blocked region irradiated with no light emerges in the sealing member. In other words, a region shaded by the light blocking section emerges therein when the light is irradiated.

According to the above arrangement, the transparent film is provided between the light blocking section (A) formed in the first substrate and the sealing member. Accordingly, when light is irradiated via the backside surface of the first substrate as with the above case, the light-blocked region (shaded portion) does not emerge in the sealing member but emerges within the transparent film. As such, the light blocking section does not cause emergence of the light-blocked region in the sealing member (i.e., the sealing member is entirely irradiated with light) unlike the conventional techniques, so that the sealing member is cured sufficiently. In this way, it is possible to prevent poor curing of the sealing member, thereby improving quality of the liquid crystal display device.

As such, the above arrangement is very simple but efficiently prevents poor curing of the sealing member. According to the above arrangement, it is therefore possible to provide such a liquid crystal display device that has a high display quality because the sealing member, especially, the contact portion of the sealing member with the liquid crystal layer is prevented from being poorly cured (the sealing member is substantially never poorly cured, preferably is completely cured) and the problem occurring due to poor curing of the sealing member is therefore solved.

According to another preferred embodiment of the present invention, a method for manufacturing a liquid crystal display device, which includes a first substrate and a second substrate provided face to face with each other and a liquid crystal layer provided between the first substrate and the second substrate, the first substrate and the second substrate being bonded together by a sealing member containing a photo curing material (a) includes: a sealing member providing step of providing the sealing member containing the photo curing material, in a circumferential portion of the first substrate having an opposed surface to the second substrate, which opposed surface has a part in which a light blocking section (A) is formed; a liquid crystal layer forming step of forming the liquid crystal layer in a region surrounded by the sealing member; and a substrate bonding step of bonding the first substrate and the second substrate together by the sealing member, the method, further including a transparent film forming step of forming, before the sealing member providing step, a transparent film at least on the light blocking section (A) provided in the opposed surface of the first substrate.

According to the above method, before forming the sealing member in the first substrate, the transparent film is formed at least on the light blocking section (A) disposed on the opposed surface of the first substrate. Accordingly, the light-blocked region does not emerge in the sealing member but emerges within the transparent film when light is irradiated so as to cure the sealing member. With this, the light is so refracted as to reach the sealing member, with the result that the sealing member is irradiated with light sufficiently. Accordingly, unlike the conventional techniques, it is not necessary to irradiate the light for a long time so as to prevent poor curing of the sealing member. This reduces light irradiation energy and improves manufacturing efficiency.

As such, the above arrangement and method are very simple but efficiently prevents poor curing of the sealing member. According to the above arrangement, it is therefore possible to provide such a liquid crystal display device that has a high display quality because the sealing member, especially, the contact portion of the sealing member with the liquid crystal layer is prevented from being poorly cured (the sealing member is substantially never poorly cured, preferably is completely cured) and the problem occurring due to poor curing of the sealing member is therefore solved.

Other features, elements, steps, characteristics and advantages of the present invention will be described below with reference to preferred embodiments thereof and the attached drawings.

DETAILED DESCRIPTION OF THE PREFERRED EMBODIMENTS

First Preferred Embodiment

Figure 1:
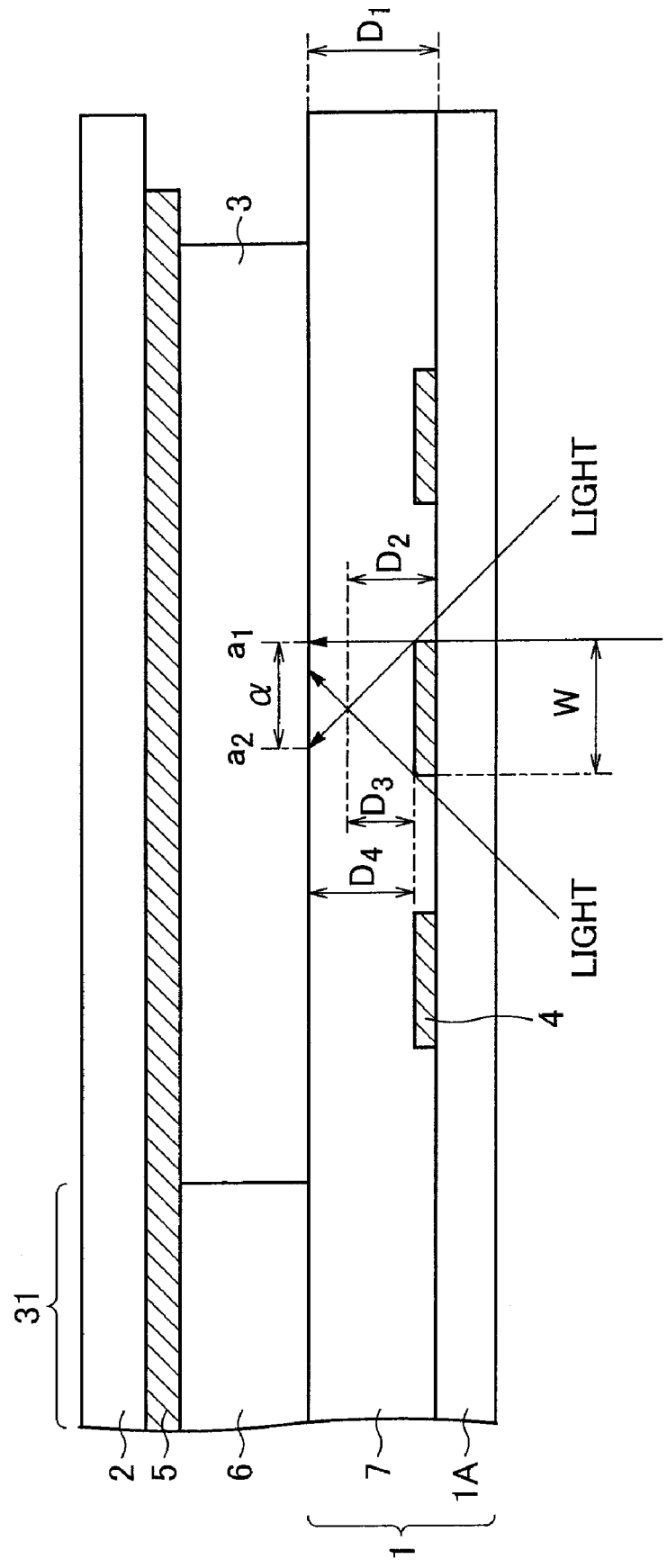
FIG. 1 is a cross sectional view schematically illustrating the structure of main parts of a liquid crystal display device according to a preferred embodiment of the present invention.
Figure 2:
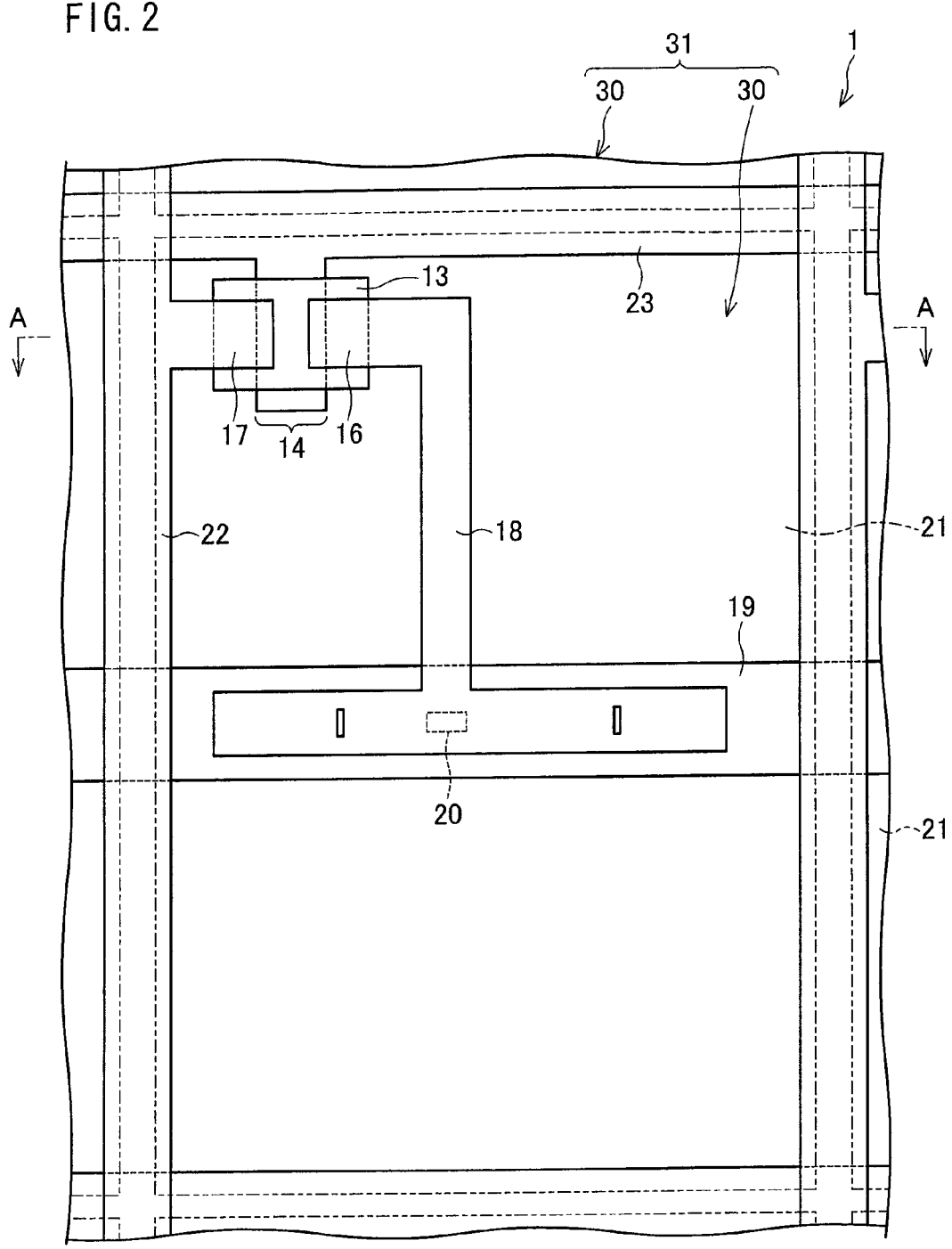
FIG. 2 is a plan view schematically illustrating the structure of an array substrate of the liquid crystal display device.
Figure 3:
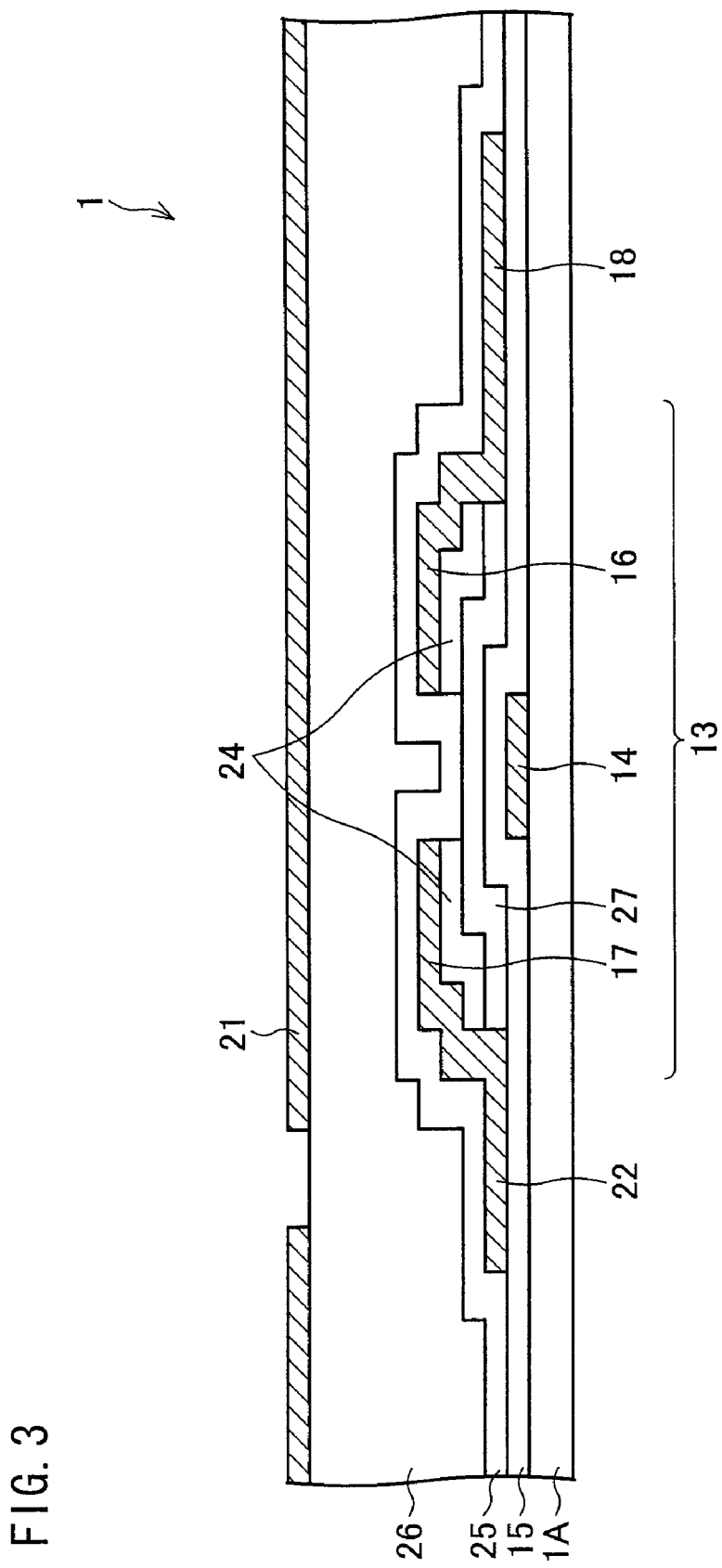
FIG. 3 is a cross sectional view illustrating the array substrate shown in FIG. 2 and taken along line A-A.
Figure 4:
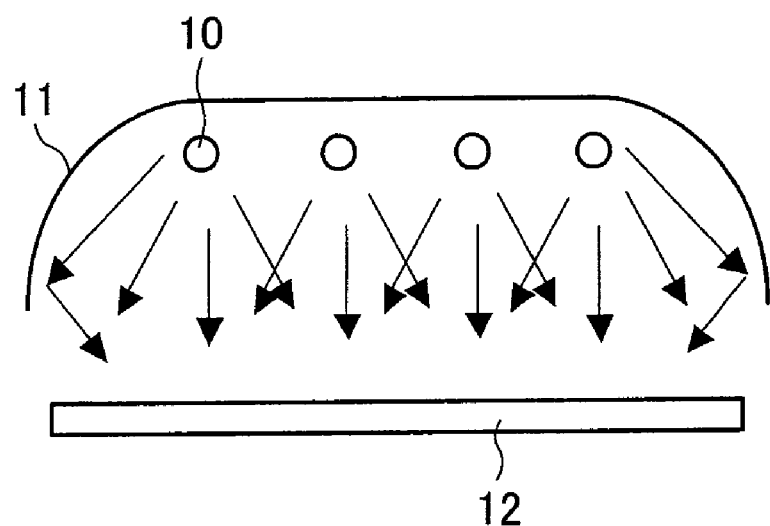
FIG. 4 is a cross sectional view schematically illustrating a light irradiating device for irradiating light to the liquid crystal display device.
Figure 8:
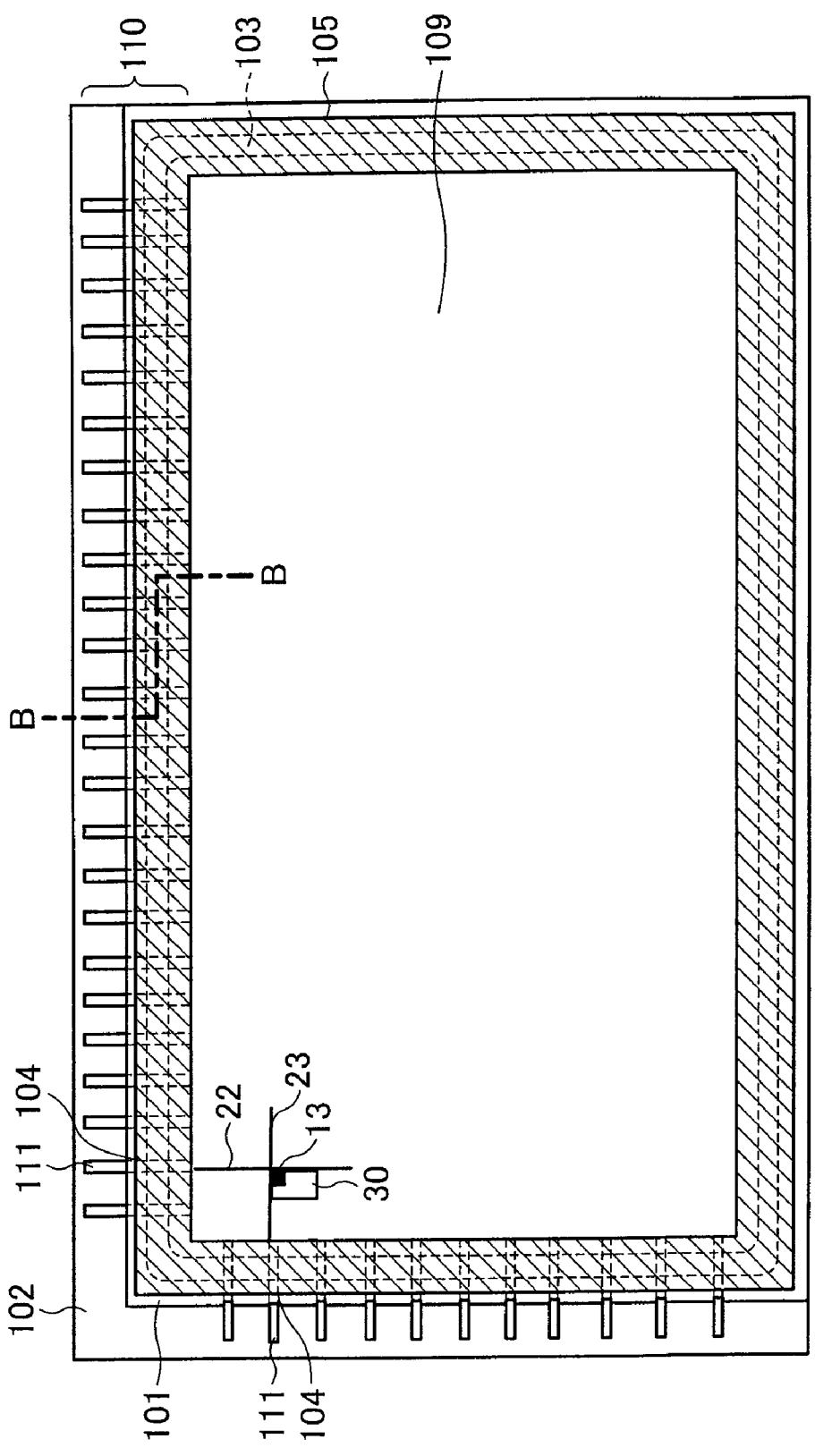
FIG. 8 is a plan view illustrating a panel portion of a conventional liquid crystal display device.

One preferred embodiment of the present invention will be explained with reference to FIG. 1 to FIG. 4. FIG. 1 is a cross sectional view schematically illustrating the structure of main parts of a liquid crystal display device according to the present preferred embodiment. The liquid crystal display device according to the present preferred embodiment has a panel section whose schematic structure viewed from a flat plane is basically the same as shown in FIG. 8, so that a plan view of the panel section thereof is omitted in the present preferred embodiment. The cross section shown in FIG. 1 is equivalent to the cross section of the liquid crystal display device taken along the line B-B of FIG. 8. Illustration of terminal sections is omitted in FIG. 1. FIG. 2 is a plan view schematically illustrating the structure of an array substrate. FIG. 3 is a cross sectional view illustrating the array substrate shown in FIG. 2 and taken along line A-A. FIG. 4 is a cross sectional view schematically illustrating a light irradiating device for irradiating light. Note that the wording "transparency (transparent)" in the present invention refers to "an object's property allowing passage of electromagnetic waves such as light", i.e., "light transmitting property".

Explained first is the array substrate suitably used in the liquid crystal display device of the present preferred embodiment. As shown in FIG. 2, the array substrate 1 used in the present preferred embodiment includes a plurality of pixel regions (pixels 30) formed in a matrix manner. Thus, the plurality of pixels 30 form a display area 31 in the array substrate 1 as shown in FIG. 1 and FIG. 2. FIG. 1 schematically illustrates the structure in the circumferential portion of the display area 31.

Further, as shown in FIG. 2 and FIG. 3, in the array substrate 1, thin film transistors (hereinafter, referred to as "TFTs"; switching elements) 13 are formed in the pixels 30, respectively.

As shown in FIG. 3, the array substrate 1 has the following structure. That is, each of the TFTs 13 is provided on a substrate (base substrate, transparent substrate) 1A (first substrate) serving as a base. A lower interlayer insulating film 25 made of silicon nitride (SiNx) and an upper interlayer insulating film 26 made of an acryl resin are provided thereon in this order. On the upper interlayer insulating film 26, a pixel electrode 21 is provided. In other words, in the array substrate 1, the lower interlayer insulating film 25 and the upper interlayer insulating film 26 are provided such that the TFT 13 and the pixel electrode 21 are separated from each other. As one example of the liquid crystal display device according to the present preferred embodiment, FIG. 2 and FIG. 3 illustrate the liquid crystal display device in which the lower interlayer insulating film 25 and the upper interlayer insulating film 26 are formed between the TFT 13 and the pixel electrode 21 provided face to face with each other. However, the liquid crystal display device according to the present preferred embodiment is not limited to this. The pixel electrode 21 does not need to be provided just above the TFT 13 necessarily.

Figure 9:
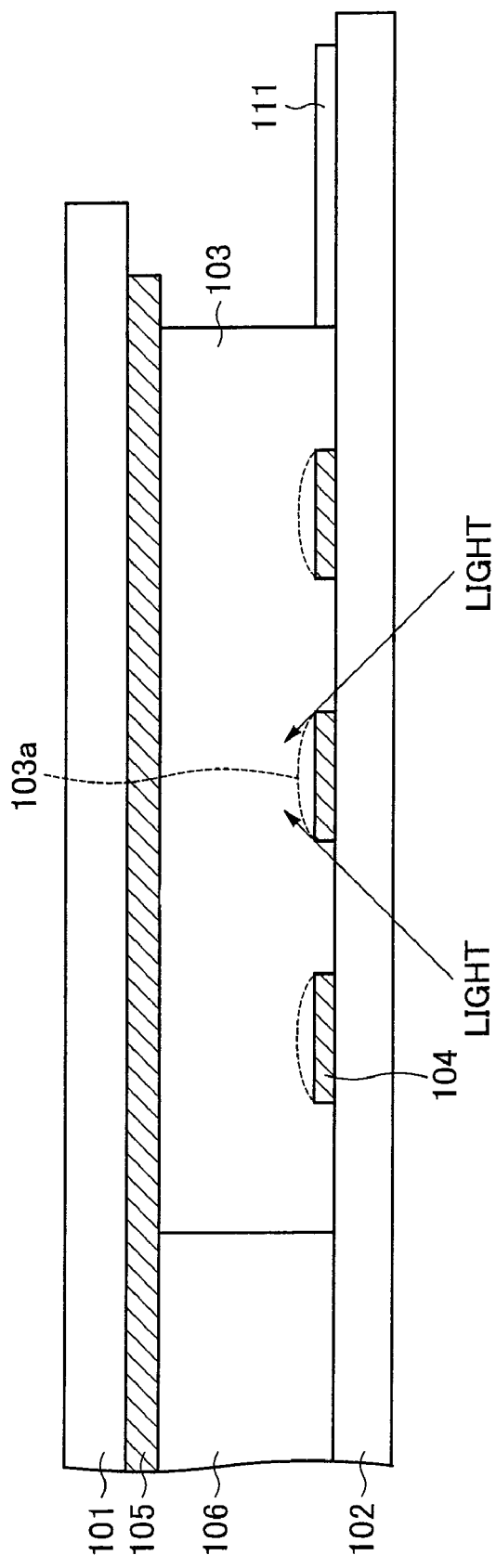
FIG. 9 is a cross sectional view illustrating the liquid crystal display device shown in FIG. 8 and taken along line B-B.

As shown in FIG. 3, the TFT 13 has a gate electrode 14 insulated by a gate insulating film 15 made of silicon nitride or silicon oxide. Further, the TFT 13 has a drain electrode 16 and a source electrode 17 connected to each other via n type semiconductor layers 24 (low-resistance semiconductor layers) and an active semiconductor layer 27. As shown in FIG. 2, the drain electrode 16 is extended via a drain extending electrode 18 so as to overlap with an auxiliary capacitor line 19. The drain extending electrode 18 is electrically connected to the pixel electrode 21 via a contact hole 20. The pixel electrode 21 is constituted by a transparent conductive film made of, e.g., ITO (Indium Thin Oxide), IZO (Indium Zinc Oxide), or the like. Further, the source electrode 17 is connected to a source line 22. There are source lines 22 and gate lines 23 connected via metal wires 4 (see FIG. 1) to the terminal sections (not shown) provided in the circumferential portion of the array substrate 1. With this, the TFTs 13 are connected to an outer circuit via the terminal sections. Each of the terminal sections has the same structure as that of each of the terminal sections 111 of the conventional liquid crystal display device shown in FIG. 8 and FIG. 9, so that explanation therefor is omitted here.

Explained next is the structure of the liquid crystal display device according to the present preferred embodiment.

As shown in FIG. 1, the liquid crystal display device includes the array substrate 1, a color filter substrate (hereinafter, referred to as "CF substrate") 2, a sealing member 3, and a liquid crystal layer 6.

The array substrate 1 has an opposed surface to the CF substrate 2. On a part of the opposed surface, the metal wires (light blocking sections (A), first light blocking sections) 4 are provided. Between the metal wires 4 and the sealing member 3, a transparent film 7 (film having a light transmitting property) is provided.

As shown in FIG. 1, each of the metal wires 4 is provided on the substrate 1A (i.e., on the opposed surface of the substrate 1A to the CF substrate 2) so as to be disposed in the circumferential portion of the substrate 1A (i.e., the circumferential portion of the array substrate 1). However, the present invention is not limited to this. The metal wires 4 herein are assumed to be all the wires formed in a sealing portion of the sealing member 3.

In the meanwhile, the CF substrate 2 is arranged such that a color filter (CF) and the like are provided on a substrate (base substrate, transparent substrate) 2A (second substrate) having a light transmitting property and serving as a base. The CF substrate 2 has an opposed surface to the array substrate 1. On the opposed surface, a BM 5 (light blocking section (B), second light blocking section) for blocking light is provided. The BM 5 is provided so as to block unnecessary light coming from outside of the liquid crystal display device, and so as to prevent light from leaking from inside of the liquid crystal display device.

The array substrate 1 and the CF substrate 2 are provided face to face with each other. Between the array substrate 1 and the CF substrate 2, the liquid crystal layer 6 is interposed. The array substrate 1 and the CF substrate 2 are bonded together via the sealing member 3. The sealing member 3 surrounds the liquid crystal layer 6 so as to seal the liquid crystal layer 6 therebetween. Note that: in the following description, it is assumed that the array substrate 1 side in the liquid crystal display device is the downward side and the CF substrate 2 side therein is the upward side.

As described above, in the array substrate 1, the display area 31 constituted by the plurality of pixels 30 (pixel regions) is formed.

As shown in FIG. 2, the source lines 22 are provided between the vertical sides of the pixels 30 (pixel regions), and the gate lines 23 are provided between the horizontal sides thereof. As described above, the source lines 22 and the gate lines 23 are connected to the terminal sections (equivalent to the terminal sections 111 shown in FIG. 8; not shown in FIG. 2) provided in the circumferential portion of the array substrate 1, via the metal wires 4 (see FIG. 1) used to supply a signal to the display area 31.

That is, the metal wires 4 are electrically connected to the pixels 30 (pixel regions) in the display area 31, and are electrically connected to the outer circuit (not shown) via the terminal sections. Each of the metal wires 4 is provided so as to, e.g., electrically connect the pixel regions to the outer circuit and allow for exchange of an electric signal therebetween.

Further, the transparent film 7 may be provided in the array substrate 1 so as to cover not only the metal wires 4 but also, e.g., all the portions in the display area 31 except the contact hole 20 and the like. In other words, the transparent film 7 may be provided on each of the pixel regions including the source lines 22 and the gate lines 23 provided in the array substrate 1. The transparent film 7 on the pixel region serves as, e.g., an interlayer insulating film.

In addition, the structure of the liquid crystal display device according to the present preferred embodiment can be described with a different expression as follows. The transparent film 7 is provided on the pixel regions including the wires provided over the substrate 1A constituting the array substrate 1, specifically, the pixel regions including the source lines 22, the gate lines 23, and the like. On the transparent film 7, the liquid crystal layer 6 and the sealing member 3 are provided such that the liquid crystal layer 6 is surrounded by the sealing member 3. On the liquid crystal layer 6 and the sealing member 3, the CF substrate 2 provided with the color filter (CF) is provided. The BM 5 is provided on the opposed surface of the CF substrate 2 to the sealing member 3. The array substrate 1 and the CF substrate 2 are bonded together via the sealing member 3 so as to be face to face with each other.

The following explains the respective members in the present preferred embodiment.

Generally available glass substrates or the like can be used as the substrates 1A and 2A (base substrates, transparent substrates (insulating substrates each having a light transmitting property)) used for the array substrate 1 and the CF substrate 2, respectively. Note that the substrates usable for the substrates 1A and 2A are not limited to the glass substrates or the like as long as they have transparency (light transmitting property), a mechanical strength, and a heat resistance sufficient for use as the substrates. Plastic substrates or the like can be used. Further, the substrates 1A and 2A are not necessarily limited to transparent substrates. In cases where the liquid crystal display device is a reflective type liquid crystal display device, the material and form of each of the substrates 1A and 2A are not particularly limited as long as, apart from the substrate which is going to serve as the display side, at least an opposed region of the substrate 1A to the sealing member 3 has a light transmitting property.

The sealing member 3 is made of a material containing a photo curing material (photo curing material (a)), such as a photo curing resin. The sealing member 3 is used to bond the array substrate 1 and the CF substrate 2 together and to seal the liquid crystal layer 6 therebetween. The photo curing resin is not particularly limited as long as it is cured by light. An acryl resin of a photo curing type, which is used in a general liquid crystal display device, can be used. Further, instead of the photo curing resin, the sealing member 3 may be made of a resin material of a photo and thermal curing type, and may be made of a material containing a photo curing material and a thermal curing material.

The transparent film 7 is made of, e.g., a transparent resin (resin having a light transmitting property). For example, an acryl resin having a refractive index of 1.4 can be used therefor. The material (material (b)) of which the transparent film 7 is made is not particularly limited to the acryl resin as long as the material has transparency (light transmitting property). The material may be either a resin other than the acryl resin or a material containing an organic compound (organic material). Examples thereof include: polyimide, polyurethane, an epoxy resin, polysiloxane, a methylsiloxane-based spin-on-glass (SOG) material, and the like. Alternatively, the transparent resin 7 may be made of an inorganic material such as a silicate-based spin-on-glass (SOG) material, as long as the transparent film 7 has transparency. The transparent resin 7 may be made of one of these materials or a mixture of not less than two of the materials.

Further, it is desirable that the refractive index of the transparent film 7 be small such that light irradiated via the backside surface of the array substrate 1 is refracted more toward a region (light-blocked region) shaded by each of the metal wires 4. It is more desirable that the refractive index of the transparent film 7 be equal to or smaller than that of the substrate 1A of the array substrate 1. It is further desirable that the refractive index of the transparent film 7 be smaller than that of the substrate 1A.

An organic compound such as a resin has a refractive index smaller than that of an inorganic compound. Such an organic compound having a small refractive index can be obtained or prepared with ease. Therefore, by using the organic compound, such as a resin, for the material of the transparent resin 7, it is possible to easily render the transparent film 7 a refractive index equal to smaller than that of the substrate 1A, more preferably, a refractive index smaller than that of the substrate 1A. For this reason, it is preferable that the transparent film 7 include a layer containing the organic compound such as a resin, and it is more preferable that the transparent film 7 include at least one layer consisting of the organic compound such as a resin. As such, it is desirable to appropriately select materials for the transparent film 7 and the substrate 1A such that the refractive index of the transparent film 7 is equal to smaller than, more preferably, is smaller than the refractive index of the substrate 1A.

When the refractive index of the transparent film 7 is small, the refraction angle of the light is large, with the result that the distance of travel-around of light is longer. As the distance of travel-around of light is longer, the width of the metal wire 4, which is the light blocking section, is allowed to be larger. On the other hand, when the refractive index of the transparent film 7 is large, the refraction angle of the light is small, with the result that the distance of travel-around of light is decreased. As a result, the sealing member 3 is not irradiated with the light sufficiently. The following specifically explains a reason for this.

Snell's law (also referred as "law of refraction") works in the transparent film 7 and the substrate 1A. Specifically, assume that the refractive index of the substrate 1A is na, the refractive index of the transparent film 7 is nb, the incident angle of the light entering the transparent film 7 is θi, and the refraction angle thereof is θr. Irrespective of the incidence angle θi, sin θi/sin θr=nb/na is always satisfied.

Therefore, as the refractive index nb of the transparent film 7 is smaller than the refractive index na of the substrate 1A, the refraction angle θr becomes larger according to the incident angle of the light entering the transparent film 7. Namely, as the refractive index of the transparent film 7 is smaller than the refractive index of the substrate 1A, the light travels around more. This reduces uncured portions of the sealing member 3.

On the other hand, as the refractive index nb of the transparent film 7 is larger than the refractive index na of the substrate 1A, the refraction angle θr becomes smaller according to the incident angle θi of the light entering the transparent film 7. Accordingly, the sealing member 3 is not irradiated with the light sufficiently.

Further, it is desirable that the transparent film 7 have a thick (high) thickness (height, film thickness) D1. In order to cure the sealing member 3 completely, it is more preferable that the thickness (height) D1 of the transparent film 7 be equal to or higher than the height D2 of the light-blocked region (region shaded by the metal wire 4) in which the light coming from the backside surface of the array substrate 1, i.e., the backside surface of the substrate 1A is blocked by the metal wire 4. Specifically, the thickness D1 of the transparent film 7 refers to the thickness from the base portion of the metal wire 4 to the top of the transparent film 7, and the height D2 refers to the base portion of the metal wire 4 to the top of the light-blocked region. As such, in the present preferred embodiment, it is preferable that the thickness (height) D1 of the transparent film 7 be equal to or higher than the height D2 of the light-blocked region in which the light is blocked by the metal wire 4, i.e., the height from the surface of the array substrate 1. In other words, it is desirable that the thickness (height) D3 of the transparent film 7 from the surface of the metal wire 4 be equal to or higher than the height D4 of the light-blocked region (region shaded by the metal wire 4) from the surface of the metal wire 4, which blocks the light coming from the backside surface of the array substrate 1, i.e., the backside surface of the substrate 1A.

Normally, when the width of the metal wire 4 is unchanged, the size of the light-blocked region (region shaded by the metal wire 4) emerging due to the metal wire 4 is unchanged. Therefore, as the thickness (height) D1 of the transparent film 7 or the thickness (height) D3 of the transparent film 7 disposed on the metal wire 4 is larger, the light-blocked region is further away from the sealing member 3 and only exists within the transparent film 7 accordingly. As a result, the light travels around toward the sealing member 3, thereby preventing poor curing of the sealing member 3. In cases where the thickness (height) D1 of the transparent film 7 is equal to or higher than the height D2, the sealing member 3 has no light-blocked region, i.e., no uncured region. This makes it possible to solve the conventional problem occurring due to the poor curing of the sealing member 3. Note that details about the film thickness of the transparent film 7 will be concretely described later.

Note also that the transparent film 7 does not need to be provided so as to entirely cover the opposed surface of the array substrate 1 (substrate 1A). The transparent film 7 may be provided only in the region in which the metal wire 4 blocks the light (region shaded by the metal wire 4). When irradiating light via the array substrate 1 (i.e., the substrate 1A), the light-blocked region is formed above the metal wire 4. Therefore, by providing the transparent film 7 even only on the metal wire 4, the light-blocked region (region shaded by the metal wire 4) exists in the transparent film 7 provided on the metal wire 4. Accordingly, the sealing member 3 is irradiated with light sufficiently, with the result that the sealing member 3 is never poorly cured.

According to the structure of the present preferred embodiment, when light is irradiated via the backside surface of the array substrate 1 (downward side of FIG. 1), the light having entered the array substrate 1 (substrate 1A) travels around the light-blocked region (region shaded by the metal wire 4) and reaches the sealing member 3 formed on the transparent film 7.

Explained here is a "degree of travel-around of light" when the light travels around. Assume that light entering the array substrate 1 (substrate 1A) in the vertical direction crosses with the sealing member 3 at an intersectional, and light entering in an oblique direction (light traveling around the light-blocked region) crosses with the sealing member 3 at an intersection a2. The "degree of travel-around of light" corresponds to a distance a between a1 and a2. For example, consider a case where no transparent film 7 is provided, i.e., where the metal wire 4 and the sealing member 3 make contact with each other. In this case, the light never travels around and a1 and a2 therefore coincide with each other, so that α is 0. That is, in this case, the sealing member 3 has a portion to which no light is irradiated and which is as wide as the width W of the metal wire 4.

The substrate 1A used in the present preferred embodiment has a refractive index of 1.54, and the transparent film 7 formed thereon has a refractive index of 1.4 and has a thickness of 3 μm. In this case, the degree a of travel-around of the light irradiated via the array substrate 1 (i.e., the substrate 1A) becomes larger by approximately 3.1 μm as compared with the case where no transparent film 7 is provided. Accordingly, as compared with the case, the sealing member 3 is irradiated with the light more by approximately 6.2 μm, which is twice as wide as the degree α. Note that the values herein are mere examples, and are not only values.

The following explains a method for manufacturing the aforesaid liquid crystal display device.

First, the TFT 13 is formed on the substrate 1A by using a publicly known method. Then, in accordance with the chemical vapor deposition (CVD) method, the layer interlayer insulating film 25 made of SiNx and having a thickness of approximately 0.3 μm to approximately 0.5 μm is formed with the use of a mixture gas including a SiH4 gas, a NH3 gas, and a N2 gas.

Next, the upper interlayer insulating film 26 made of a photosensitive acryl resin and having a thickness of approximately 2.0 μm to approximately 4 μm is formed through photolithography so as to include the contact hole 20, a terminal section contact region for each gate line 23, and a terminal section contact region for each source line 22. In cases where unevenness in the film thickness of the upper interlayer insulating film 26 thus formed does not affect a normal display function, it is preferable that the film thickness of the upper interlayer insulating film 26 be thick (large) for attainment of the advantages of the present invention. Especially in cases where the upper interlayer insulating film 26 is made of a resin, the film thickness of the upper interlayer insulating film 26 can be thick more easily in terms of process and cost, as compare with a case where the upper interlayer insulating film 26 is made of an inorganic film. Note that, the material of which the upper interlayer insulating film 26 is made is not limited to the resin. For example, the upper interlayer insulating film 26 may be an inorganic film that is made of an inorganic material and that is caused to have a thick thickness relatively with ease. A specific example of such an inorganic film is a film made of a silicate-based inorganic spin-on-glass (SOG). Note that the aforesaid thickness of 2.0 μm to 4 μm is determined in consideration of maintaining flatness of the resin used herein, so that the thickness of the upper interlayer insulating film 26 is not limited to this range.

However, in cases where the thickness of the upper interlayer insulating film 26 is thicker than 4 μm, which is the upper limit, unevenness in the film thickness becomes more noticeable, so that it is desirable that the thickness of the upper interlayer insulating film 26 be equal to or smaller than 4 μm.

Further, the upper interlayer insulating film 26 is made of an acryl resin having a relative dielectric constant of approximately 3. It is appropriate that the upper interlayer insulating film 26 has a thickness of 2 μm or more so as to exhibit an effect as an upper interlayer insulating film.

The upper interlayer insulating film 26 can be used as the transparent film 7, as described later. By forming the upper interlayer insulating film 26 serving as the transparent film 7, the upper interlayer insulating film 26 and the transparent film 7 are formed simultaneously. In cases where the upper layer insulating film 26 is thus used as the transparent film 7, it is preferable that the upper interlayer insulating film 26 have a film thickness of 2 μm or more, in view of the travel-around of light by the transparent film 7 provided on the light blocking film such as the metal wire 4.

In the meanwhile, the line width of a metal wire of a liquid crystal display device manufactured in accordance with a general manufacturing method is approximately 3 μm for resolution limit. Further, a material used for the transparent film 7 has a refractive index of approximately 1.4 at minimum. Accordingly, from the following Formula (1), it is preferable that the thickness of the upper interlayer insulating film 26 be 1.5 μm or more.

$$W \leq \sum_{k=1}^{m} 2 \times d_k \times \sqrt{\frac{1}{n_k^2 - 1}} \quad (1)$$

where W indicates the width of the metal wire 4, m ($1 \leq m$) indicates the number of transparent films, nk ($1 < nk$) indicates the refractive index of the k-th ($1 \leq k \leq m$) transparent film counted from the side in which the substrate 1A is provided in the array substrate 1, i.e., in which the metal wire 4 is provided in the array substrate 1, and dk indicates the film thickness of the transparent film. Formula (1) above represents a relation between the width W of the metal wire and the transparent film. Formula (2) below takes into consideration a case where the light entering the glass substrate has an incident angle of up to 70°.

$$W \leq \sum_{k=1}^{m} 2 \times d_k \times \sqrt{\frac{0.88}{n_k^2 - 0.88}} \quad (2)$$

From Formula (2), it is preferable that the thickness of the upper interlayer insulating film 26 be 1.7 μm or more. In consideration of margin, it is more preferable that the thickness thereof be 2 μm or more. Details about Formula (1) and Formula (2) will be described later in the fourth preferred embodiment.

In cases where the transparent film 7 is made up of a plurality of layers, e.g., where the transparent film 7 has such a multilayer structure that a transparent film (first transparent film) formed on the metal wire 4 and made of silicon nitride or silicon oxide is covered with a transparent film (second transparent film) made of a resin or SOG, it is desirable, in consideration of balance between the flatness thereof and effect thereof, that the total film thickness of the transparent films (film thickness of the whole transparent films) be 1.5 μm or more, be preferably 1.7 μm or more, be more preferably 2 μm or more, and the upper limit of the total film thickness be 4 μm. The thicker the film thickness of the transparent film 7 is, the more the advantages of the present invention is achieved effectively. However, in consideration of easiness in forming the transparent film 7, flatness thereof, deterioration of transparency thereof, and the like, it is realistic that the upper limit of the film thickness is approximately 4 μm. Details of providing the plurality of transparent films as such will be described in preferred embodiments below.

Thereafter, the pixel electrode 21 is formed on the upper interlayer insulating film 26 by using a publicly known method, with the result that the array substrate 1 on which the pixel 30 (pixel region) is formed is manufactured.

Next, the transparent film 7 is formed on the metal wire 4 with the use of a transparent material so as to cover the metal wire 4 above which the sealing member 3 is to be disposed when being provided in the array substrate 1 (transparent film forming step). The method for forming the transparent film 7 on the array substrate 1 (i.e., forming the transparent film 7 on the substrate 1A) is not particularly limited, and any method can be used therefor such as the photolithography and the spin coating method. The transparent film 7 thus formed is thick in its thickness, so that it is desirable that the transparent resin has a high viscosity when being applied onto the substrate 1A of the array substrate 1. Further, not only the metal wires 4 but also the entire pixel regions (pixels 30) (the entire display area 31) may be covered with the transparent film 7. In this case, the pixel regions are protected. This further improves reliability of the product.

Next, onto the circumferential portion of the array substrate 1 on which the transparent film 7 is thus formed, a resin containing the photo curing material (photo curing material (a)) is applied so as to provide the sealing material 3 in the form of a frame along the circumferential portion of the array substrate 1 (sealing member providing step). A way of providing the sealing member 3 is not particularly limited. The sealing member 3 may be provided in the same way as when forming a general liquid crystal display device. For example, the sealing member 3 is provided by applying (seal drawing) the resin containing the photo curing material onto the circumferential portion of the array substrate in accordance with the seal dispenser method or the screen printing method.

Next, a liquid crystal is provided within the frame formed by the sealing member 3, thereby forming the liquid crystal layer 6 (liquid crystal layer forming step). A method of providing the liquid crystal is not particularly limited, and any publicly known method can be used. For example, it is possible to use the liquid crystal dropping adhesion method. That is, the liquid crystal layer 6 is formed by regularly dropping the most appropriate amount of a liquid crystal within the frame, formed by the sealing member 3, such that a desired cell gap is attained by the liquid crystal. The dropping is carried out in accordance with the liquid crystal dropping method. Whether or not the liquid crystal display device has employed the liquid crystal dropping method and the liquid crystal dropping adhesion method using the liquid crystal dropping method can be judged by judging whether an injection opening for injecting a liquid crystal is provided therein. In cases where the liquid crystal display device employs the liquid crystal dropping method and the liquid crystal dropping adhesion method using the liquid crystal dropping method, no injection opening is required. The sealing member 3 is uninterrupted and is in the form of a frame, so that the surface of the sealing member (outer circumferential wall and inner circumferential wall) is evenly flat. In contrast, in the case of the liquid crystal injecting method, the injection hole for the liquid crystal is sealed by the sealing member 3 afterward, so that there is left a trace of sealing in the location in which the injection opening used to exist.

Next, the array substrate 1 and the CF substrate 2 are bonded together via the sealing member 3 (substrate bonding step). The CF substrate 2 and the array substrate 1 to which the seal drawing and the liquid crystal dropping are carried out as described above are bonded together as follows. That is, atmosphere in a bonding device is reduced to 1 Pa, and the substrates are bonded together under such a reduced pressure. Then, the atmosphere in the bonding device is brought back to the atmospheric pressure, with the result that the sealing member 3 is pressed down. With this, a desired gap is obtained between the substrates in the portion (sealing portion) sealed by the sealing member 3.

Next, light is irradiated via the array substrate 1 (substrate 1A) so as to cure the sealing member 3. In cases where the sealing member 3 is a photo and thermal curing type, a baking process is further carried out. Thereafter, the substrates bonded together are cut into individual liquid crystal panels (cut based on a liquid crystal panel as a unit).

Through these steps described above, the liquid crystal display device is manufactured. Note that arrows in FIG. 1 indicate directions in which the light travels. There are many directions (incident angles) in which the light entering the array substrate 1 travels; however, for ease of explanation, only the light in oblique directions is illustrated therein.

Explained here is the light irradiating device for irradiating the light. As the light irradiating device, a conventionally used device may be used. For example, as shown in FIG. 4, a general light irradiating device is made up of light sources 10 and a reflective plate 11. The reflective plate 11 is used such that light coming from each of the light sources 10 is irradiated uniformly onto a processed substrate 12, which is to be a liquid crystal display device.

The reflective plate 11 reflects the light coming from the light sources 10, so that not only light perpendicular to the surface (light incident surface) of the processed substrate 12 but also light oblique thereto enter the surface of the processed substrate 12 thereof. Arrows in FIG. 4 indicate directions in which the light travels.

Further, generally speaking, in cases where the processed substrate 12 is made of glass, light is reflected by the surface of the processed substrate 12. Hence, an effective incident angle of light with respect to the surface of the substrate is approximately 70° with respect to the normal line of the surface of the processed substrate 12. In cases where the glass has a refractive index of, e.g., 1.5 to 1.7 which is greater than the refractive index of air, the angle of light refracted by the processed substrate 12 is smaller than the incident angle of the light entering the processed substrate 12.

In cases where such a light irradiating device is used to cure the sealing member 3, the metal wire 4 blocks the light irradiated via the backside surface (lower side) of the array substrate 1, with the result that the light-blocked region (region shaded by the metal wire 4) emerges in the transparent film 7 provided on the metal wire 4. That is, the transparent film 7 is formed in the portion where the light-blocked region emerges. On this occasion, light uniformly enters the array substrate 1 in various directions, with the result that the light travels around the light-blocked region and is irradiated sufficiently on the sealing member provided on the transparent film 7. In other words, instead of the sealing member 3, the transparent film 7 is formed in the portion having not been irradiated with light conventionally. Accordingly, the metal wire 4 and the sealing member 3 are distant away from each other. This allows the light to travels around easily, so that the uncured portion of the sealing member 3 is reduced.

Figure 12:
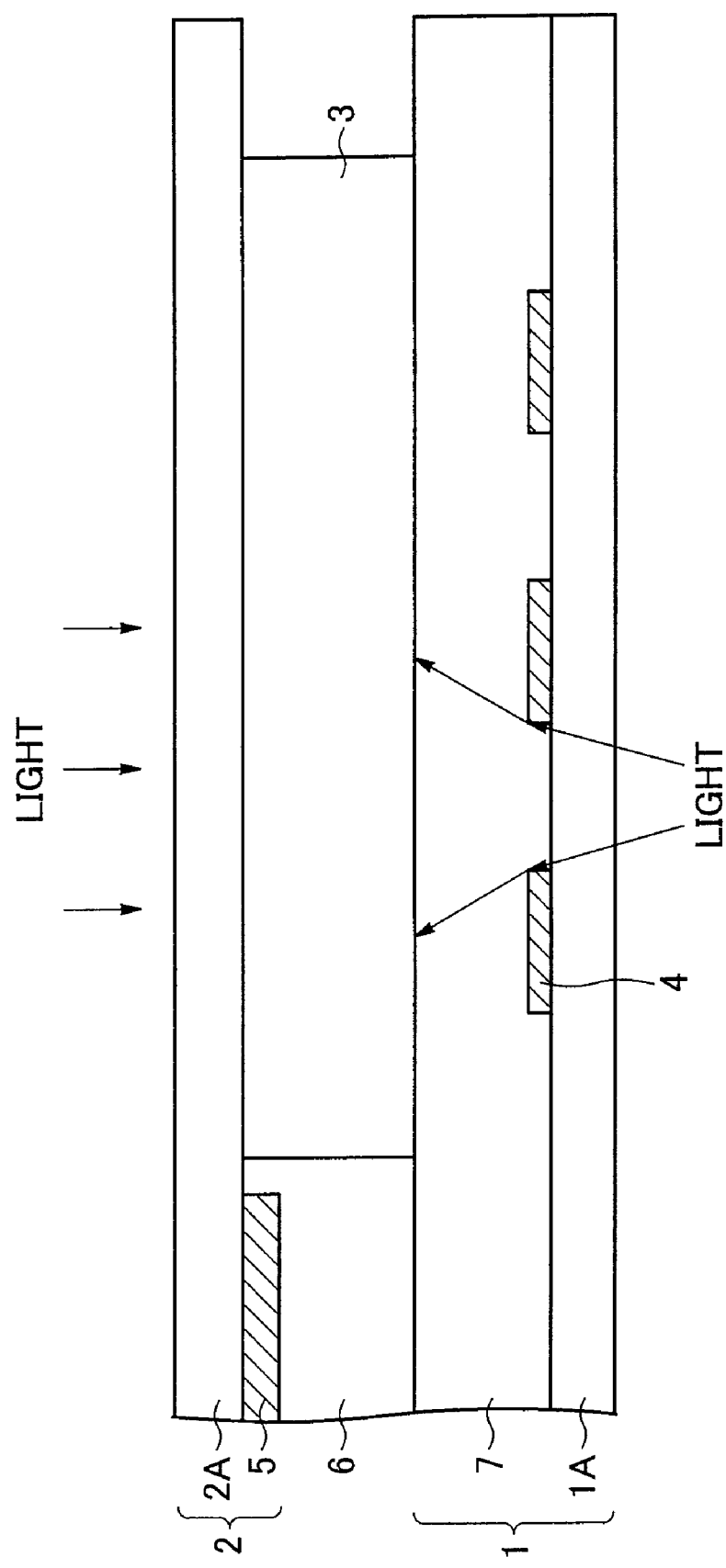
FIG. 12 is a cross sectional view illustrating the structure of main parts of a liquid crystal display device according to still another preferred embodiment of the present invention.

In the explanation above, it is assumed that the BM 5 is provided on the portion sealed by the sealing member 3 as shown in FIG. 1 and light is irradiated only via the array substrate 1. However, in cases were the BM 5 is provided with an opening section 5a facing the sealing member 3 as shown in FIG. 12 (i.e., where the BM 5 is partially formed or the BM 5 is not provided), light may be irradiated via both the array substrate 1 and the CF substrate 2. In this case, the sealing member 3 is cured efficiently, as compared with the case where light is irradiated thereto via only one of the substrates.

Instead of additionally providing the transparent film 7 on the metal wire 4, the upper interlayer insulating film 26 may be so formed as to cover not only the TFT 13 but also the circumferential portion of the array substrate 1. This makes it unnecessary to form the transparent film 7 additionally. Because the film also manufactured in a conventional process for manufacturing a liquid crystal display device is used to cover the metal wire 4 formed on the circumferential portion of the array substrate 1, the process does not need to be changed. In other words, the step of forming the transparent film 7 is not required, so that the manufacturing steps are simplified.

In cases where the transparent film 7 is formed at one time with the formation of the upper interlayer insulating film 26 as described above, it is preferable that the thickness (height) D1 of the transparent film 7 be 4 μm or less. In cases where the thickness (height) D1 of the transparent film 7 is thicker than 4 μm, it is difficult to form the transparent film 7 such that the thickness (height) D1 is even. That is, it is difficult to form the upper interlayer insulating film 26 such that the thickness thereof is even. In this case, the pixel electrodes 21 cannot be provided appropriately on the upper interlayer insulating film 26. Accordingly, among the plurality of pixels 30 (pixel regions) of the liquid crystal display device, the thicknesses from the surface of the array substrate 1 to the surfaces of the pixel electrodes 21 are likely to be uneven. This possibly causes luminance unevenness in the liquid display device.

In the explanation of the present preferred embodiment, the material of the interlayer insulating film formed at one time with the formation of the transparent film is the acryl resin;

however, other resin material or a spin-on-glass may be used therefor. Further, a film made of an SOG is highly transparent and is excellent in its property as the interlayer insulating film. Further, some SOG has a refractive index of 1.4 or smaller, and it is easy to form a film having a film thickness as thick as that of the acryl resin. Therefore, the use of the SOG, especially the one having a refractive index of 1.4 or smaller, is effective to prevent poor curing of the sealing member 3 as is the case with the acryl resin.

Note that the SOG is normally not a photosensitive resin. For patterning of the SOG, photolithography needs to be additionally applied using a resist and then an etching process needs to be carried out. The transparent film is not limited to the aforesaid transparent film formed at one time with the formation of the interlayer insulating film such as the upper interlayer insulating film 26. The transparent film may be formed at one time with formation of a transparent film used for other purposes such as a planarizing film or a protecting film, or may be formed additionally only for attainment of the advantages of the present invention.

In the explanation of the present preferred embodiment, the metal wire 4 is exemplified as the light blocking section; however, the light blocking section may be other patterns that have a light blocking property or that do not allow passage of light sufficiently. Examples of the light blocking section include: a gap material made of a metal and provided in the sealing portion, a dummy pattern for adjusting transmittance, and a BM having an opening section. In other words, the present invention is applicable to all the cases where a pattern (construction) that has a light blocking property or that does not allows passage of light sufficiently is formed in the sealing portion.

Second Preferred Embodiment

Figure 5:
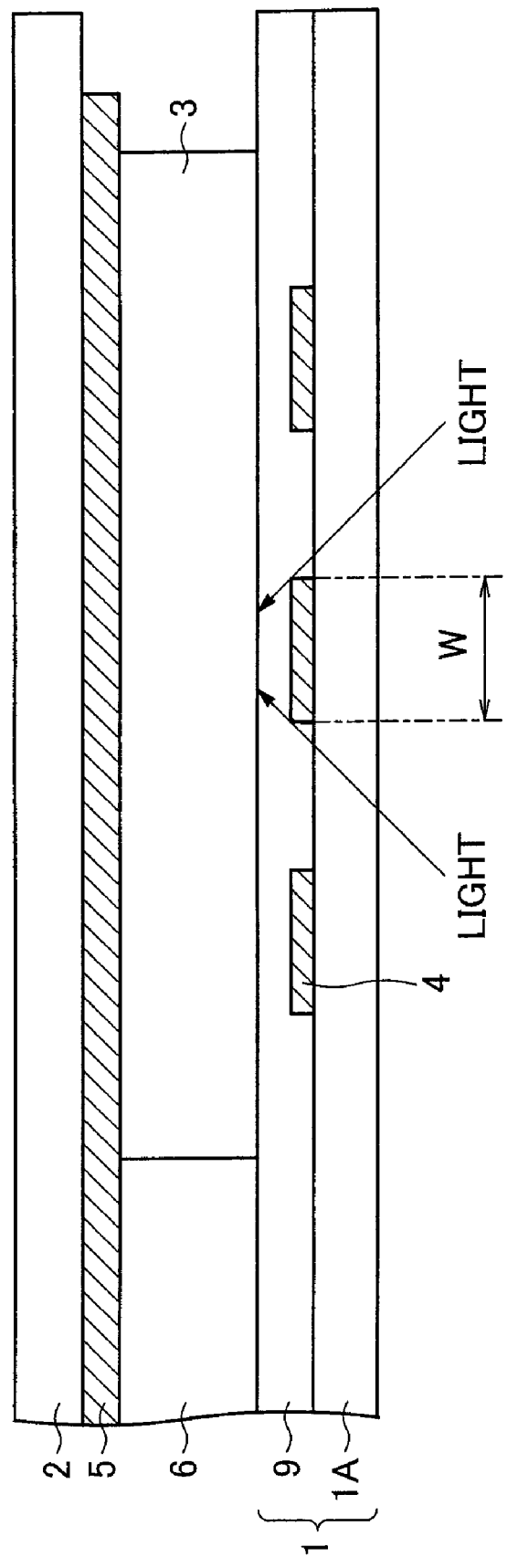
FIG. 5 is a cross sectional view schematically illustrating the structure of main parts of a liquid crystal display device according to another preferred embodiment of the present invention.

Another preferred embodiment of the present invention will be described below with reference to FIG. 5. In FIG. 5, component members equivalent to those shown in the first preferred embodiment are rendered the same reference numerals and detailed explanation therefor is omitted. The present preferred embodiment is the same as the first preferred embodiment, except that a material for the transparent film is not the transparent resin but silicon nitride (SiNx).

FIG. 5 is a cross sectional view schematically illustrating the structure of main parts of a liquid crystal display device according to the present preferred embodiment. As shown in FIG. 5, in the liquid crystal display device according to the present preferred embodiment, a transparent film 9 is provided between the array substrate 1 and the sealing member 3. The transparent film 9 can be made of a material containing silicon nitride, which is a material used in a general liquid crystal display device. Silicon nitride has a refractive index of 2.0, which is larger than that of the substrate 1A that is generally used in the array substrate 1. Although the refractive index of the substrate 1A differs depending on a material of which the substrate 1A is made, the refractive index thereof is usually smaller than 2.0. In the present preferred embodiment, a glass substrate having a refractive index of 1.5 to 1.7 is used as the substrate 1A, for example. Accordingly, light entering the transparent film 9 has a refractive angle θr smaller than the refractive angle θr of the light entering the transparent film 7 of the first preferred embodiment. However, as compared with the conventional liquid crystal display device provided with no transparent film 9, light travels around greatly over the metal wire 4. In other words, the light-blocked region in the sealing member 3 is reduced as compared with the conventional liquid crystal display device provided with no transparent film 9. Further, as described above, silicon nitride is a material generally used for a TFT liquid crystal display element, so that the manufacturing process does not need to be changed for the sake of manufacturing the transparent film 9. This is advantageous.

Note that the material used for the transparent film 9 is not limited to silicon nitride, and silicon oxide ($SiO_2$) may be used. Generally, $SiO_2$ is used as (i) a hard coating material for a liquid crystal display device or (ii) a passivation film of a TFT. $SiO_2$ has a relatively small refractive index of 1.46 to 1.50. When forming a film made of $SiO_2$, the film has a film thickness of 0.3 μm to 1.0 μm. Therefore, when a substrate having a refractive index of not less than 1.5, particularly, a substrate having a refractive index of more than 1.5 μm is used as the substrate 1A, light greatly travels around over the metal wire 4.

Further, the material used for the transparent film 9 may be ITO (Indium Tin Oxide) or IZO (Indium Zinc Oxide). Generally speaking, such a transparent film 9 made of ITO or IZO has a film thickness of approximately 0.1 μm to approximately 0.3 μm, and has a refractive index of 2.1 to 2.2. By combining such a transparent film 9 with silicon nitride, it is possible to form a transparent film 9 having a thicker film thickness. Note that both ITO and IZO are materials used in a general liquid crystal display device.

As such, in cases where a layer containing such a transparent electrode material, especially, a layer (transparent electrode layer) consisting of the transparent electrode material is formed on the metal wires 4 as the transparent film 9, it is possibly necessary to design such a layout that the wires are not short-circuited. For example, a region in which the transparent electrode layer is not formed may be provided in the middle of a space between the metal wires 4 (between adjacent metal wires 4) such that the transparent electrode layers thus formed on the metal wires 4 respectively do not make contact with each other. Alternatively, a layer made of a transparent insulating material is provided between the metal wires 4 and the transparent electrode layer. Note that an effect exhibited by providing the transparent film 9 will be described later.

According to the above structure, when light is irradiated from below the array substrate 1 (from below the substrate 1A), the transparent film 9 provided on each of the metal wires 4 allows the entered light to travels around the light-blocked region and reach the sealing member 3 formed on the transparent film 9. For example, in cases where the substrate 1A of the array substrate 1 has a refractive index of 1.54 and the transparent film 9 formed therein has a refractive index of 2 and has a thickness of 0.8 μm, the degree of travel-around of the light entering via the array substrate 1 (i.e., via the substrate 1A) becomes large by approximately 0.5 μm as compared with the case where no transparent film 9 is formed. In other words, the light is irradiated in an area approximately 0.5 μm larger than that in the case where no transparent film 9 is formed. Therefore, each of the metal wires 4 has a width W of 1 μm, the sealing member 3 is entirely irradiated with the light. Note that the values herein are mere examples and are not only values.

Explained next is a step of forming the transparent film 9 on the array substrate 1. On the substrate 1A on which the metal wires 4 are provided, the transparent film 9 made of silicon nitride is formed in accordance with the CVD method by introducing a mixture gas made up of a $SiH_4$ gas, a $NH_3$ gas, and a $N_2$ gas. The transparent film 9 thus formed has a film thickness of approximately 0.3 μm to 1 μm and covers the array substrate 1. Note that steps other than this step of forming the transparent film 9 are the same as those in first preferred embodiment, so that explanation therefor is omitted here.

Further, the method of forming the transparent film 9 is not limited to the CVD method. The transparent film 9 may be formed by using a method of forming a passivation film or a gate insulating film 15, each of which is provided in a general liquid crystal display device so as to protect a semiconductor section (TFT 13) made of silicon nitride.

According to the above structure, the transparent film 9 is additionally formed in the array substrate 1; however, it is possible to render the lower interlayer insulating film 25 a function as the transparent film 9. In this case, the step of forming the lower interlayer insulating film 25 on the TFT 13 in first preferred embodiment is used to form the lower interlayer insulating film 25 at one time with the formation of the transparent film 9. In this case, only an exposure mask pattern for use in forming the lower interlayer insulating film 25 through photolithography is changed, so that the step of forming the transparent film 9 is not necessary. This simplifies the manufacturing steps.

Third Preferred Embodiment

Figure 6:
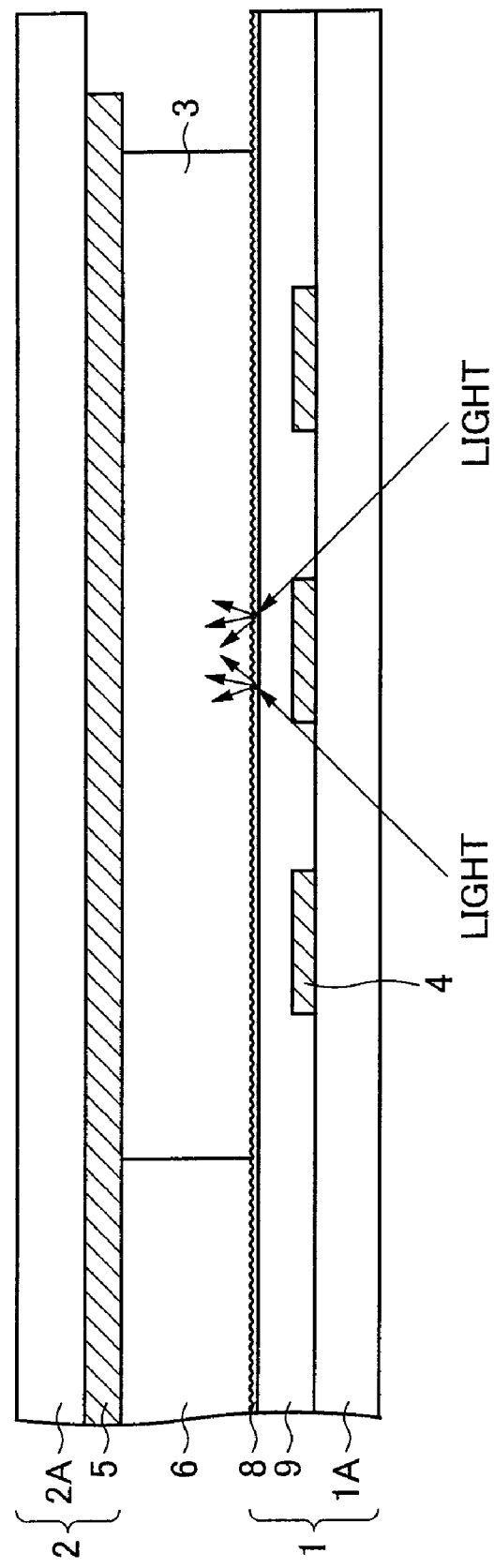
FIG. 6 is a cross sectional view schematically illustrating the structure of main parts of a liquid crystal display device according to still another preferred embodiment of the present invention.

Still another preferred embodiment of the present invention will be described below with reference to FIG. 6. In FIG. 6, component members equivalent to those shown in the first and second preferred embodiments are rendered the same reference numerals and detailed explanation therefor is omitted. The present preferred embodiment is the same as the second preferred embodiment above, except that the transparent film 9 has a surface on which a section with irregularities is formed. The surface faces the sealing member 3.

FIG. 6 is a cross sectional view schematically illustrating the structure of main parts of a liquid crystal display device according to the present preferred embodiment. As shown in FIG. 6, a dimple section 8 is formed on the surface of the transparent film 9. In the dimple section 8, irregularities are formed at a pitch of several μm to several ten μm. This makes it possible to refract, in various directions, light entering via the array substrate 1. The light is diffused by the dimple section 8 even in cases where the metal wire 4 has a large width as compared with the thickness of the transparent film 9 and the region shaded by the metal wire 4 (i.e., the light-blocked region) is therefore large, so that the sealing member 3 is efficiently irradiated with the light. This makes it possible to prevent poor curing of the sealing member 3.

However, it is desirable that a material of which the dimple section 8 is made have a refractive index different from either the refractive index of the sealing material 3 that makes contact with the dimple section 8 formed on the surface of the transparent film 9, or the refractive index of the transparent film 9. This makes it possible to refract light in various directions.

Note that the meaning of the wording "irregularities" is "not smooth". Therefore, the shape of the dimple section 6 is not particularly limited as long as the dimple section 8 is so formed as to refract the incoming light in various directions.

Explained next is a step of forming the dimple section 8 on the transparent film 9.

After forming the transparent film 9 in the same manner as the second preferred embodiment, a new transparent layer is formed on the transparent film 9. During the formation of the new transparent layer, a fine pattern is provided thereon, with the result that the dimple section 8 is formed.

Here, the method of forming the dimple section 8 on the transparent film 9 is not particularly limited. The dimple section 8 may be formed by applying a photosensitive resin onto the transparent film 9 and carrying out halftone exposure with respect to the photosensitive resin. Further, by using a positive type resist as the photosensitive resin, it is possible to carry out exposure under conditions that a light exposure amount is small. In this case, a direct light exposure amount may be reduced. Alternatively, the exposure is carried out via a film serving as a mask absorbing light.

Instead of additionally forming the dimple section 8 on the transparent film 9, the transparent film 9 may have an irregular surface. In this case, a fine pattern is formed directly on the transparent film 9 upon forming the transparent film 9. The same effect is obtained in both the case where the surface of the transparent film 9 is made irregular and the case where the dimple section 8 is additionally formed on the transparent film 9.

In cases where the liquid crystal display device according to the present preferred embodiment is a reflective type and semi-transparent type liquid crystal display device, the pixel electrode 21 also serves as a reflecting film. Therefore, a material having a high reflectance, such as aluminum, is used therefor. In cases where the reflecting film is flat, mirror reflection occurs, with the result that the members formed around the reflecting film are likely to be reflected in the reflecting film as if they were reflected in a mirror.

For prevention of such mirror reflection by the pixel electrode 21, it is preferable that irregularities be provided on the pixel electrode 21 so as to reflect light such that the light is diffused to some extent. The irregularities thus formed diffuse the light, thereby preventing the mirror reflection. The irregularities are formed on the pixel electrode 21 by, e.g., (i) forming irregularities on the upper interlayer insulating film 26 disposed under the pixel electrode 21 and (ii) forming the pixel electrode 21 on the upper interlayer insulating film 26. In this case, the pixel electrode 21 is formed along the irregularities of the upper interlayer insulting film 26, thus forming the irregularities in the pixel electrode 21. Details about the method of forming the irregularities are omitted because there are publicly known documents regarding the methods of manufacturing such a reflective type liquid crystal display element.

Further, in cases where a transparent interlayer insulating film having irregularities is formed to face the sealing member 3, upon forming the irregularities on the upper interlayer insulating film 26 for the sake of preventing the mirror reflection, it is possible to form, on the transparent film facing the sealing member 3, the irregularities for use in the light diffusion, without increasing the manufacturing process.

Fourth Preferred Embodiment

Yet another preferred embodiment of the present invention will be described below with reference to FIG. 7. In FIG. 6, component members equivalent to those shown in the first to third preferred embodiments are rendered the same reference numerals and detailed explanation therefor is omitted. The present preferred embodiment is the same as the first to third preferred embodiments, except that two transparent films are provided between the array substrate 1 and the sealing member 3.

By providing the plurality of transparent films as such, it is possible that the total thickness of the transparent films becomes thick and that the transparent films are formed in the process of forming the TFT 13 in the array substrate 1.

Figure 7:
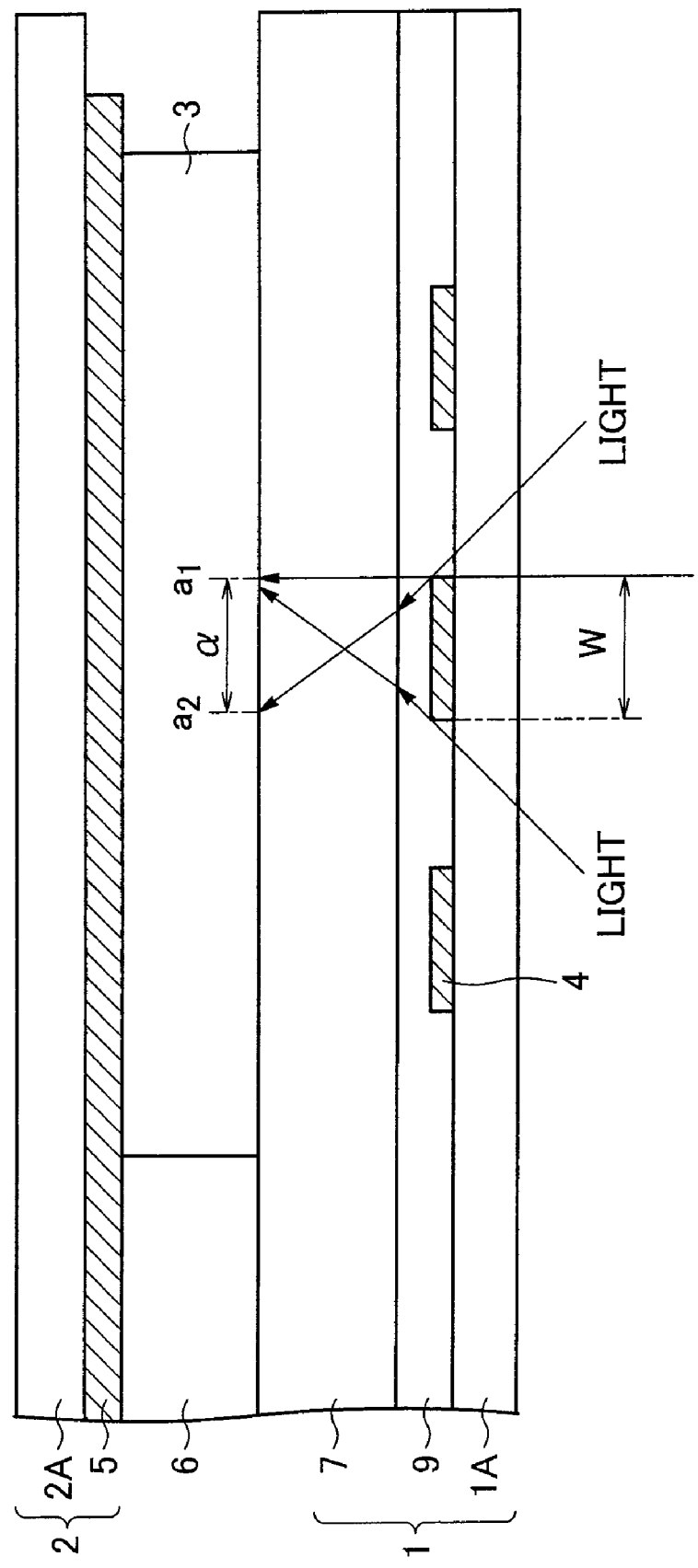
FIG. 7 is a cross sectional view schematically illustrating main parts of a liquid crystal display device according to yet another preferred embodiment of the present invention.

FIG. 7 is a cross sectional view schematically illustrating the structure of main parts of a liquid crystal display device according to the present preferred embodiment. As shown in FIG. 7, there are the two transparent films between (i) each metal wire 4 formed in the array substrate 1 and (ii) the sealing member 3. A lower one of the two transparent films is the transparent film 9 made of silicon nitride (SiNx) and an upper one thereof is the transparent film 7 made of the transparent resin. The substrate 1A of the array substrate 1 has a refractive index of 1.54, the transparent film 7 has a refractive index of 1.4 and has a thickness of 3 μm, and the transparent film 9 has a refractive index of 2 and has a thickness of 0.8 μm.

When light is irradiated to the array substrate 1 via the backside surface thereof so as to cure the sealing member 3, the two transparent films allow the degree a of refraction of the light to be 3.6 μm. In this case, as long as the width W of the metal wire 4 is 7.2 μm or smaller, the light-blocked region wholly exists within the transparent films 7 and 9. This makes it possible to easily cure the sealing member 3 while light irradiation energy is not increased.

Further, it is desirable that the refractive index of each of the transparent films 7 and 9 be as small as possible and the thickness thereof be as large as possible. It is more preferable that the refractive index of each of the transparent films 7 and 9 be not more than the refractive index of the substrate 1A of the array substrate 1. It is further preferable that the refractive index of each of the transparent films 7 and 9 be smaller than the refractive index of the substrate 1A. When the refractive index of each of the transparent films 7 and 9 is small and the thickness thereof is large, the degree of travel-around of the light is further increased, with the result that the sealing member 3 is cured even when the width of the light blocking section is further wide.

Especially in cases where the refractive indexes of the transparent films 7 and 9 are smaller than the refractive index of the substrate 1A of the array substrate 1, the light having entered the array substrate 1 passes through the substrate 1A and is refracted by the transparent films 7 and 9 toward the light-blocked region. This reduces the light-blocked region, with the result that the light is entirely irradiated on the sealing member 3 with ease. Namely, the sealing member 3 is cured with ease, thereby attaining an effect of reducing the irradiation energy.

Further, the transparent films may be provided on the metal wire 4 in the order of the transparent films 7 and 9. Also in this case, the sealing member 3 is sufficiently irradiated with the light as is the case with the structure in which the transparent films are provided in the order of the transparent films 9 and 7. Accordingly, the sealing member 3 is entirely cured.

Further, a relation between the width W of the metal wire and each of the transparent films can be expressed by Formula (1), where W indicates the width W of the metal wire 4, m (1≦m) indicates the number of transparent films, nk (1<nk) indicates the refractive index of the k-th (1≦k≦m) transparent film counted from the side in which the substrate 1A is provided in the array substrate 1, i.e., in which the metal wire 4 on the array substrate 1 is provided, and dk indicates the film thickness of the k-th transparent film. It is desirable that each transparent film satisfies Formula (1).

$$W \leq \sum_{k=1}^{m} 2 \times d_k \times \sqrt{\frac{1}{n_k^2 - 1}} \quad (1)$$

By setting the number of transparent films, the film thickness thereof, and the refractive index thereof in accordance with the width W of the metal wire 4, the sealing member 3 can be cured while no light irradiation energy is increased. As long as Formula (1) is satisfied, any material can be used for the material of each transparent film and the number of transparent films can be set arbitrarily. Note that Formula (1) and Formula (2) described later are applicable to a case where one transparent film is provided.

Formula (1) is derived as follows.

Generally, the light used in curing the sealing member is not parallel light, but the light is irradiated from various angles to the glass substrate such that the substrate is irradiated with the light at a uniform intensity and the light reaches the light-blocked region.

The light passes through and gets out of the first transparent film. The first transparent film has a film thickness d1, a refractive index n1 (1<n1), and a refracting angle θ1. Assume that a horizontal distance in the first transparent film is α'. Now, according to Snell's law, α' is modified as the below-described formula, where θα indicates an incident angle at which the light enters the glass substrate, θβ indicates the refraction angle of the glass substrate, na indicates the refractive index of air, and nβ indicates the refractive index of the glass substrate. Note that the wording "horizontal distance" herein refers to the degree of travel-around of light.

$$\alpha' = d_1 \times \tan\theta_1 = d_1 \times \sqrt{\frac{\sin^2\theta_1}{1 - \sin^2\theta_1}} = d_2 \times \sqrt{\frac{n_1^2 \times \sin^2\theta_1}{n_1^2 - n_1^2 \times \sin^2\theta_1}} =$$

$$d_2 \times \sqrt{\frac{n_\beta^2 \times \sin^2\theta_\beta}{n_1^2 - n_\beta^2 \times \sin^2\theta_\beta}} = d_2 \times \sqrt{\frac{n_\alpha^2 \times \sin^2\theta_\alpha}{n_1^2 - n_\alpha^2 \times \sin^2\theta_\alpha}}$$

The incident angle θα at which the light enters the glass substrate never exceeds 90°, and the refractive index na of the air is 1. Accordingly, the below-described formula is obtained. Note that light entering the surface of the glass substrate at an incident angle θα of 90° cannot be used practically. However, the degree of travel-around of the light is slightly larger than that shown in the above formula actually, due to influences of (i) light diffracted by the end of the light blocking section and (ii) light diffused in the transparent films or the like. Therefore, it is not necessary to pay attention to such a fact that the light entering the surface of the glass substrate at an incident angle θα of 90° cannot be used practically.

$$\alpha' = d_1 \times \sqrt{\frac{1}{n_1^2 - 1}}$$

Next, the light travels around, and passes through and gets out of the second transparent film. A horizontal distance α" in the second transparent film can be calculated in the same manner. Here, the second transparent film has a film thickness d2, has a refractive index n2 (1<n2), and has a refraction angle θ2.

$$\alpha'' = d_2 \times \tan\theta_2 = d_2 \times \sqrt{\frac{n_\alpha^2 \times \sin^2\theta_\alpha}{n_2^2 - n_\alpha^2 \times \sin^2\theta_\alpha}} = d_2 \times \sqrt{\frac{1}{n_2^2 - 1}}$$

A horizontal distance in the third transparent film or later can be calculated in the same manner. From these results, it is understood that a distance corresponding to the degree of travel-around of light in a certain transparent film merely depends on (i) the angle at which the light enters the glass substrate, (ii) the refractive index of air, (iii) the refractive index of the transparent film, and (iv) the film thickness thereof. Therefore, it is apparent that the angle at which the light enters each of the transparent films and the order in which the transparent films are provided are not relevant. Accordingly, in cases where there are the plurality of transparent films, the horizontal distance in the array substrate 1 is mere a total of the respective horizontal distances in the transparent films. Further, the light enters from the both sides with respect to the light blocking section, so that the width W of the light blocking section may be actually equal to or smaller than the length twice as large as the total of the horizontal distances (total of the degrees of refraction of light). Thus, the width W of the light blocking section can be expressed by the following Formula (1).

$$W \leq \sum_{k=1}^{m} 2 \times d_k \times \sqrt{\frac{1}{n_k^2 - 1}} \quad (1)$$

Further, generally speaking, when the incident angle at which the light enters the glass substrate is wider than 70°, a light attenuation rate due to reflection by the surface of the glass substrate is larger. Further, when the light irradiating device has such a property that the intensity of the light therefrom depends on the angle and the incident angle at which the light enters the glass substrate is large, the light is likely to have a weak intensity. Therefore, it is desirable that the width W of the light blocking section satisfy Formula 2 derived in consideration of the case where the incident angle at which the light enters the glass substrate is up to 70°.

$$W \leq \sum_{k=1}^{m} 2 \times d_k \times \sqrt{\frac{0.88}{n_k^2 - 0.88}} \quad (2)$$

Note that Formula (2) is derived by carrying out calculation in the same manner as Formula (1), with θα set at 70°.

Further, "2" outside the root in Formulas (1) and (2) indicates the light entering from the both sides with respect to the light blocking section, and "1" or "0.88" in numerator and denominator within the root of Formulas (1) and (2) indicates a constant depending on the incident angle.

Even in cases where the number of transparent films, the refractive index, and the film thickness do not satisfy Formula (1) or (2), the effect of the present preferred embodiment is exhibited, i.e., the two transparent films allows the light to travel around toward the light-blocked region more as compared with the conventional structure, with the result that the sealing member 3 is cured with ease. Accordingly, irradiation time does not need to be long, so that irradiation energy is reduced. As a result, it is possible to reduce the irradiation energy as compared with the conventional technique.

For example, consider a where the width W of the metal wire 4 is 50 µm, the refractive index of the substrate 1A of the array substrate 1 is 1.54, the refractive index of the transparent film 7 is 1.4, the thickness thereof is 3 µm, the refractive index of the transparent film 9 is 2, and the thickness thereof is 0.8 µm. In this case, as compared with the conventional technique, it is possible to reduce by 10% the minimum irradiation energy required for curing of the sealing member 3. Note that the width W of the metal wire 4 cannot be thick without limitation, and the upper limit thereof may fall within a range from 100 µm to 500 µm.

Further, the use of Formula (1) or (2) makes it possible to predict the effect of the present invention in advance, so that there is such a benefit that it is easy to design the liquid crystal display device.

Note that: also in the present preferred embodiment, each of the transparent films may be made of a material described in the first to third preferred embodiments. For example, in cases where the transparent film is made of SOG, such a transparent film can be formed to have a thick thickness. Accordingly, from Formula (1) or (2), the width W of the light blocking section can be selected to be large.

Fifth Preferred Embodiment

Still another preferred embodiment of the present invention will be described below with reference to FIG. 10(*a*) to FIG. 10(*c*). In FIGS. 10(*a*) to 10(*c*), component members equivalent to those shown in the first to fourth preferred embodiments are rendered the same reference numerals and detailed explanation therefor is omitted.

FIG. 10(*a*) to FIG. 10(*c*) schematically illustrate the structure of a liquid crystal display device of the present preferred embodiment. FIG. 10(*a*) is a plan view. FIG. 10(*b*) illustrates main parts (portion indicated by C in FIG. 10(*a*)) in FIG. 10(*a*). FIG. 10(*c*) is a cross sectional view taken along line D-D of FIG. 10(*b*). For avoidance of complication of FIG. 10(*a*) and FIG. 10(*b*), the CF substrate 2 and the black matrix 5 are not illustrated therein.

As shown in FIG. 10(*a*) to FIG. 10(*c*), the liquid crystal display device of the present preferred embodiment has metal wires 4, which serve as light blocking sections (first light blocking sections) and extend in the form of lines from the liquid crystal layer 6 to the sealing member 3 in parallel with one another. The transparent film 7 is provided in the lower part of an end portion (boundary) at which the sealing member 3 makes contact with the liquid crystal layer 6, so as to cover the metal wires 4 provided on the substrate 1A.

That is, as long as adhesion strength of the sealing member 3 is secured, the transparent film 7 may be provided at least in the contact surface side of the sealing member 3 with the liquid crystal layer 6. The sealing member 3 contains a photo curing material (photo curing material (a)), for example, is of a photo currying type. As such, the transparent film 7 does not need to be formed just below the sealing member 3 so as to make contact with the entire surface of the sealing member 3, but may be provided in the part just below the end (boundary, interface) at which the sealing member 3 makes contact with the liquid crystal layer 6 and in the vicinity of the portion.

However, the transparent film 7 needs to be formed entirely along the part at which the sealing member 3 and the liquid crystal layer 6 make contact with each other. For example, in the case shown in FIG. 10(*a*), the transparent film 7 needs to be formed entirely along the interface of the sealing member 3 with the liquid crystal layer 6.

When an ingredient of the sealing member 3 is melted from uncured portions into the liquid crystal layer 6, spots are likely to occur. Therefore, at least the sealing member 3 in the portion at which the sealing member 3 and the liquid crystal layer 6 make contact with each other needs to be irradiated with light. Accordingly, it is desirable that an area in which the transparent film 7 is formed, i.e., "the part just below the end at which the sealing member 3 makes contact with the liquid crystal layer 6 and the vicinity of the part" correspond to not less than "(the width of each light blocking section)+

(the film thickness of the transparent film)×2". In addition, the width of the transparent film 7 needs to be not less than a width allowing for a uniform film thickness. In cases where the width of the transparent film 7 is too short, the film thickness of the transparent film 7 is likely to be uneven due to the following reasons: (i) resolution limit, (ii) tapering of the edge of the transparent film 7 occurring due to melting by heat in cases where the transparent film is made of a resin, and the like.

Figure 10A:
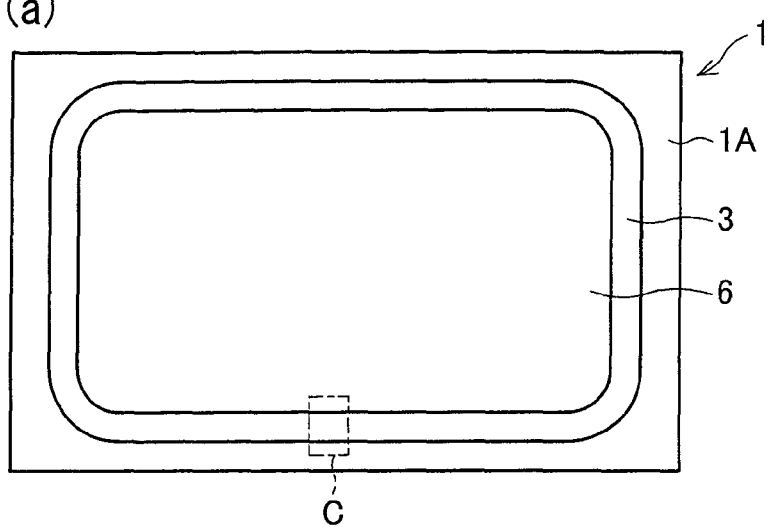
FIG. 10(a) is a plan view schematically illustrating the structure of a liquid crystal display device according to still another preferred embodiment of the present invention.
Figure 10B:
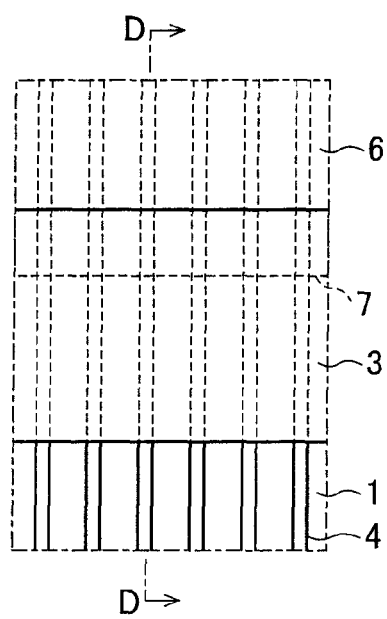
FIG. 10(b) is an enlarged plan view schematically illustrating a portion, indicated by C in FIG. 10(a), of the structure of the liquid crystal display device according to a preferred embodiment of the present invention.
Figure 10C:
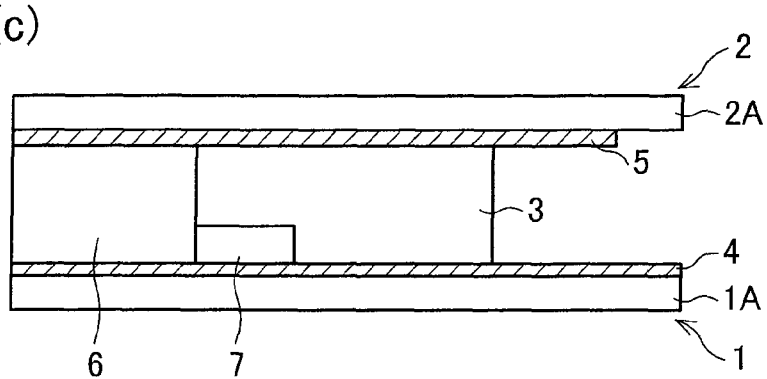
FIG. 10(c) is a cross sectional view schematically illustrating the liquid crystal display device according to the preferred embodiment of the present invention and taken along line D-D of FIG. 10(b).
Figure 11:
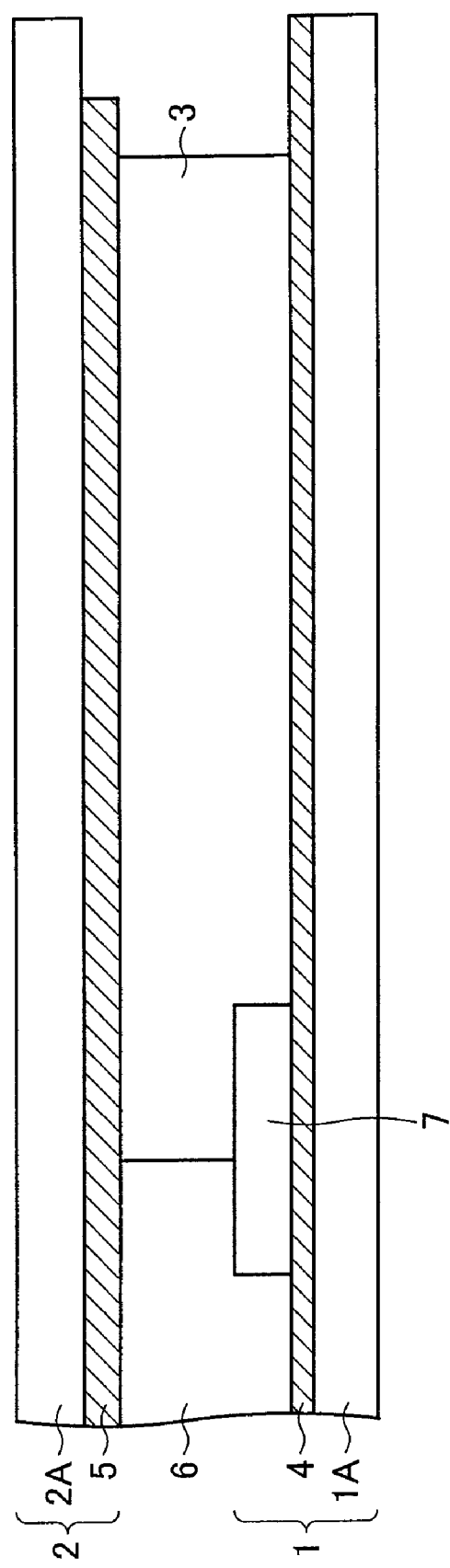
FIG. 11 is a cross sectional view illustrating the structure of main parts of a liquid crystal display device according to yet another preferred embodiment of the present invention.

In the present preferred embodiment, the transparent film 7 is not provided in the side in which the liquid crystal layer 6 is provided, as shown in FIG. 10(c); however, the transparent film 7 may be provided in the side in which the liquid crystal display layer 6 is provided, as shown in FIG. 11.

Here, in terms of reliability of the liquid crystal display device, there is no difference between the following cases, for example: (1) a case where the light blocking sections such as the metal wires 4 are formed in the form of lines in the array substrate 1 so as to have a width of 50 μm or less, an opening section in which no light blocking sections are formed is formed, and the transparent film 7 is provided so as to extend from the boundary between the sealing member 3 and the liquid crystal layer 6 to a location corresponding to approximately ¼ of the width (sealing width) of the sealing member 3 (no transparent film 7 is provided just below a part corresponding to the rest, ¾, of the sealing width of the sealing member 3) as shown in FIG. 10(a) to FIG. 10(c); and (2) a case where the transparent film 7 is formed just below the sealing member 3 so as to meet the entire surface thereof. A reason why there is no difference therebetween lies in the following point. That is, an outer portion of the sealing member 3 with respect to the end at which the sealing member 3 and the liquid crystal layer 6 makes contact with each other does not meet the liquid crystal layer 6. Therefore, even when there is an uncured portion in the outer portion of the sealing member 3, the reliability is not influenced as long as the adhesion strength of the sealing member 3 is sufficient.

Note that the sealing member 3 may be made of a photo and thermal curing type material.

Sixth Preferred Embodiment

Figure 13:
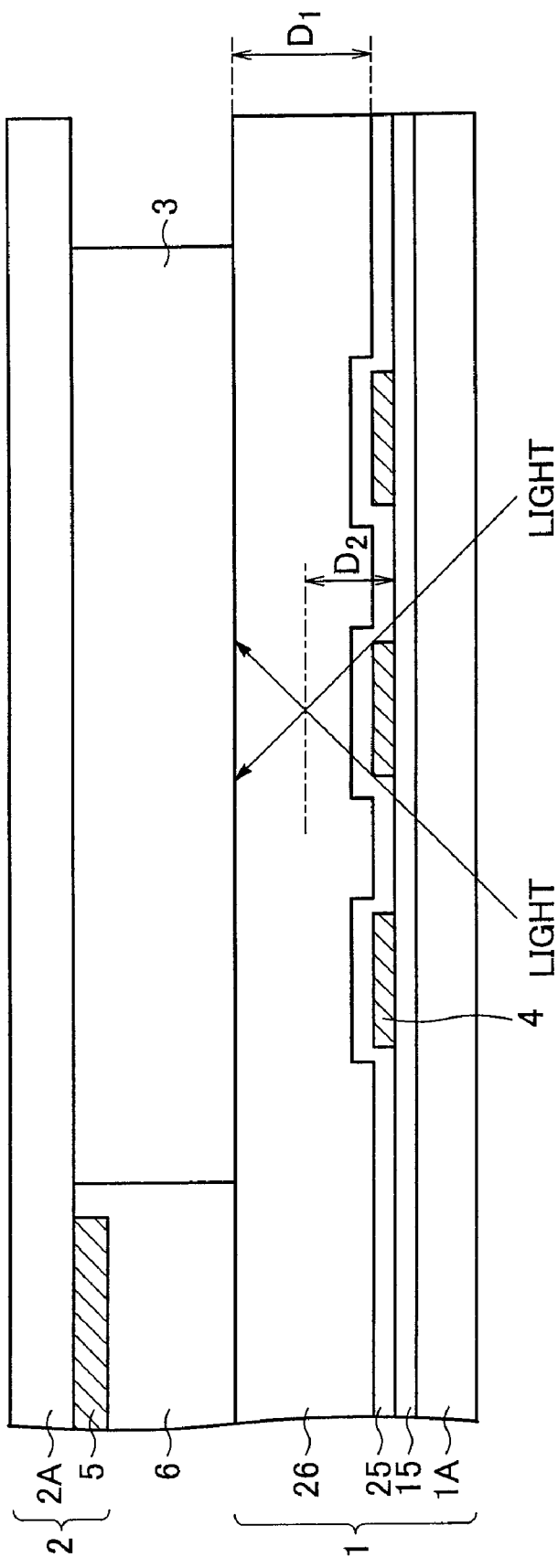
FIG. 13 is a cross sectional view illustrating the structure of main parts of a liquid crystal display device according to yet another preferred embodiment of the present invention.

Yet another preferred embodiment of the present invention will be described below with reference to FIG. 13. In FIG. 13, component members equivalent to those shown in the first to fifth preferred embodiments are rendered the same reference numerals and detailed explanation therefor is omitted. The present preferred embodiment is the same as the first to fifth preferred embodiments, except that: two transparent films are provided between the array substrate 1 and the sealing member 3, the metal wires 4 in the circumferential portion (sealing portion) of the array substrate 1 and the source lines 22 are provided in the same layer, the gate insulating film 15 is provided under the source lines 22 and the metal wires 4, and the interlayer insulating film covering the TFT 13 and the transparent film covering the metal wires 4 are respectively constituted by the lower interlayer insulating film 25 and the upper interlayer insulating film 26.

Also in the present preferred embodiment, the plurality of transparent films are provided, so that the total film thickness of the transparent films can be thick as described above. Further, the transparent films can be formed in the process of forming the TFT 13 in the array substrate 1.

FIG. 13 is a cross sectional view schematically illustrating main parts of the liquid crystal display device according to the present preferred embodiment. As shown in FIG. 13, the liquid crystal display device according to the present preferred embodiment is arranged such that the two transparent films are provided, between the metal wires 4 and the sealing member 3, on the gate insulating film 15 provided in the array substrate 1. The gate insulating film 15 is made of silicon nitride, each of the source lines 22 is constituted by a source metal. The lower one of the two transparent films is the lower interlayer insulating film 25, which is a transparent film made of silicon nitride. The upper one thereof is the upper interlayer insulating film 26, which is a transparent film made of an acryl-based resin. The substrate 1A of the array substrate 1 has a refractive index of 1.54, the upper interlayer insulating film 26 has a refractive index of 1.4 and has a thickness of 3 μm, and the lower interlayer insulating film 25 has a refractive index of 2 and has a thickness of 0.5 μm.

Such a structure is realized by providing, also in the circumferential portions of the array substrate 1, the gate insulating film 15 constituting the TFT 13, the lower interlayer insulating film 25, and the upper interlayer insulating film 26.

The lower interlayer insulating film 25 is provided on the TFT 13, contains an inorganic material (inorganic compound) consisting of silicon nitride or the like, and serves as a channel protecting layer. Specifically speaking, when the active semiconductor layer 27 forming the channel of the TFT 13 makes contact with the upper interlayer insulating film 26 containing an organic material (organic compound), the OFF property and long-term reliability of the TFT 13 are deteriorated. Therefore, the lower interlayer insulating film 25 containing the inorganic material (inorganic compound) is provided between the TFT 13 and the upper interlayer insulating film 26 containing the organic material (organic compound), with the result that the deterioration of the OFF property and the long-term reliability of the TFT 13 is restrained. It is preferable that the lower interlayer insulating film 25 consist of the inorganic material (inorganic compound). Further, the upper interlayer insulating film 26 containing the organic material (organic compound) can be formed to have a thick film thickness relatively with ease. This makes it possible to reduce parasitic capacitances between the pixel electrodes 21 and the source lines 22 in the pixels 30 (pixel regions), thereby improving display quality.

The following explains a method for manufacturing the array substrate 1. The method is according to the present preferred embodiment.

First, the gate lines 23 and the auxiliary capacitor lines 19 are formed on the transparent substrate 1A as follows. That is, sputtering is carried out so as to form a metal film such as a Ti/Al/Ti film stack. Next, a resist is provided on the metal film, and a resist pattern is formed through photolithography. Thereafter, the metal film is subjected to dry etching using an etching gas such as a chlorine-based gas. In the dry etching, the resist pattern is used as a mask. As a result of the dry etching, the metal film is patterned. Then, the resist is removed. In this way, the gate lines 23 and the auxiliary capacitor lines 19 are formed simultaneously on the substrate 1A.

Thereafter, the gate insulating film 15 made of silicon nitride (SiNx) or the like, the active semiconductor layer 27 made of amorphous silicon or the like, a low-resistance semiconductor layer made of amorphous silicon to which phosphorous or the like is doped and constituting the n type semiconductor layers 24 are formed in accordance with the CVD. The gate insulating film 15 is formed to extend to the circumferential portion of the substrate 1A. The circumferential portion is the region (sealing portion) to which the sealing member 3 is to be applied.

Thereafter, the source lines 22, the source electrodes 17, the drain extending electrodes 18, and the drain electrodes 16 are formed as follows. That is, sputtering is carried out so as to form a metal film such as an Al/Ti film stack. Next, a resist is provided on the metal film, and a resist pattern is formed through photolithography. Thereafter, the metal film is subjected to dry etching using an etching gas such as a chlorine-based gas. In the dry etching, the resist pattern is used as a mask. As a result of the dry etching, the metal film is patterned. Then, the resist is removed. In this way, the source lines 22, the source electrodes 17, the drain extending electrodes 18, and the drain electrodes 16 are formed simultaneously. On this occasion, the metal wires 4 are simultaneously formed in the circumferential portion of the substrate 1A (the circumferential portion of the array substrate 1) so as to be connected to the source lines 22.

Note that an auxiliary capacitor is formed between each auxiliary capacitor line 19 and each drain extending electrode 18 extending above the auxiliary capacitor line 19, with the gate insulating film 15 interposed therebetween. The gate insulating film 15 has a thickness of approximately 0.5 μm.

Next, in order to separate the source and the drain (in order to form the channel), the low-resistance semiconductor layer made of amorphous silicon or the like to which phosphorous or the like has been doped is subjected to dry-etching using an etching gas (concretely, chlorine gas) such as a chlorine-based gas, with the result that the TFT 13 is formed.

Thereafter, the lower interlayer insulating film 25 made of silicon nitride (SiNx) or the like is formed on the gate insulating film 15 in accordance with the CVD so as to cover the TFT 13. The lower interlayer insulating film 25 is provided to extend to the region (sealing portion) to which the sealing member 3 is to be applied, i.e., to the circumferential portion of the substrate 1A, so as to cover the metal wires 4. The lower interlayer insulating film 25 thus provided is used as not only the channel protecting film of the TFT 13 but also the transparent film (first transparent film) covering the metal wires 4.

Next, the upper interlayer insulating film material consisting of the acryl-based photo curing resin or the like is applied onto the lower interlayer insulating film 25 by way of spin coating, thereby forming the upper interlayer insulating film 26 on the lower interlayer insulating film 25 so as to extend to the circumferential portion of the substrate 1A but so as to exclude the terminal sections. In other words, the upper interlayer insulating film 26 is formed so as to cover the metal wires 4 and extend to the circumferential portion of the substrate 1A, i.e., the portion that is to be the region (sealing portion) to which the sealing member 3 is to applied, but so as to exclude the terminal sections. The upper interlayer insulating film 26 thus formed is used as not only the interlayer insulating film for separating the TFT 13 and the pixel electrode 21 from each other, but also the transparent film (second transparent film) covering the metal wire 4.

Thereafter, the contact hole 20 is formed so as to electrically connect the drain extending electrode 18 to the pixel electrode 21, as follows. That is, a contact hole is formed in the upper interlayer insulating film 26 through photolithography. The upper interlayer insulating film 26 has a film thickness of approximately 3 μm.

While using the upper interlayer insulating 26 as an etching mask, etching is carried out with respect to a portion of the lower interlayer insulating film 25 below the contact hole, with the result that the contact hole 20 is formed so as to penetrate the upper interlayer insulating film 26 and the lower interlayer insulating film 25. At the same time as the formation of the contact hole 20, the gate insulating film 15 and the lower interlayer insulating film 25 are etched such that portions covering the terminal sections provided in the circumferential portion of the array substrate 1 are removed therefrom. The etching is carried out so as not to remove the gate insulating film 15, the lower interlayer insulating film 25, and the upper interlayer insulating film 26 from the region (region to be the sealing portion) which is located in the circumferential portion of the array substrate 1 and to which the sealing member 3 is to be applied. By forming the lower interlayer insulating film 25 and the upper interlayer insulating film 26 in this way, the interlayer insulating film in the TFT section (i.e., the interlayer insulating film covering the TFT 13) and the transparent film covering the metal wire 4 are formed simultaneously.

Thereafter, a transparent conductive film made of ITO or the like is formed on the upper interlayer insulating film 26 by way of sputtering, and a resist pattern is formed through photolithography on the transparent conductive film thus formed. While using the resist pattern as a mask, the transparent conductive film is etched using an etching solution such as a mixture solution of ferric chloride and hydrochloric acid, with the result that the pixel electrode 21 is patterned and formed.

In this way, the pixel region is formed and the region to be the sealing portion is formed in the circumferential portion of the array substrate 1.

In the present preferred embodiment, the gate insulating film 15 is provided between each metal wire 4 and the substrate 1A as described above, so that it is desirable that the thickness (height, film thickness) D1 of the transparent film covering the metal wire 4, i.e., the thickness from the base portion of the metal wire 4 to the top of the transparent film 4 be not lower than the height from the surface of the gate insulating film 15 to the top of the light-blocked region in which light is blocked by the metal wire 4, i.e., the height D2 from the base portion of the metal wire 4 to the top of the light-blocked region.

In the present preferred embodiment, the metal wires (light blocking sections, first light blocking sections) 4 are metal wires connected to the source lines 22; however, the present invention is not limited to this. The metal wires 4 may be, e.g., dummy patterns formed in the layer in which the source lines 22 are formed.

Seventh Preferred Embodiment

Figure 14:
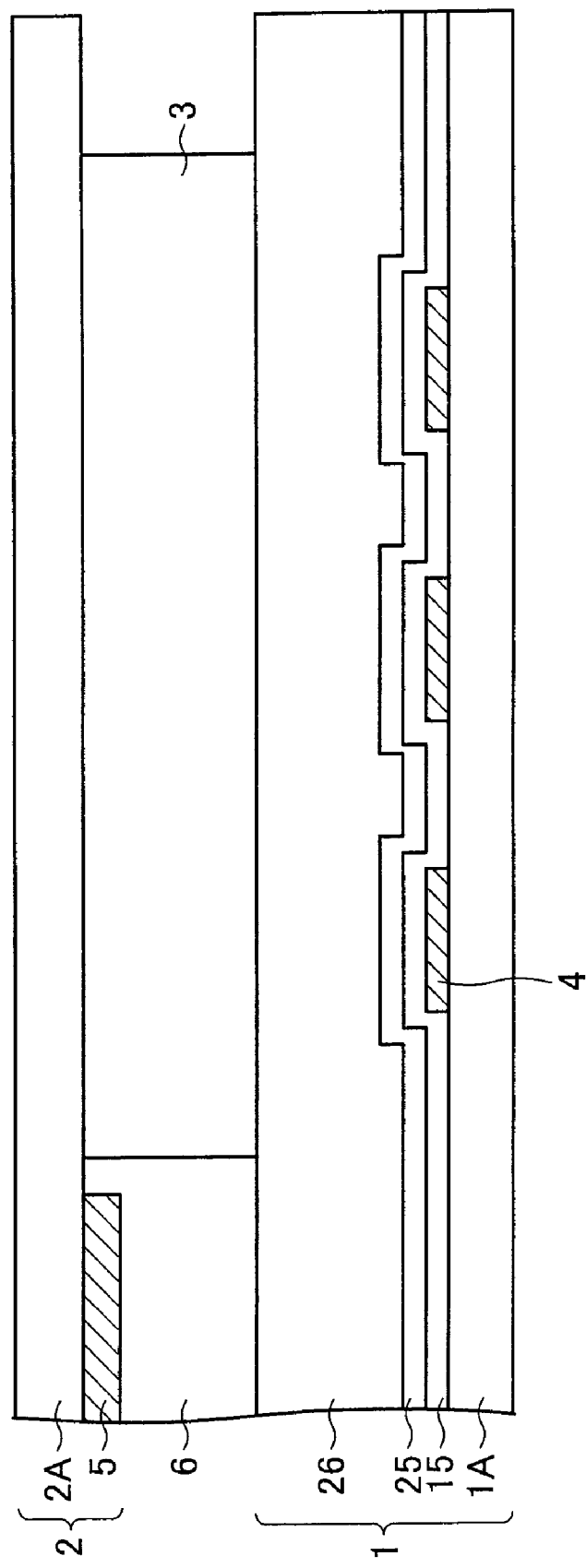
FIG. 14 is a cross sectional view illustrating the structure of main parts of a liquid crystal display device according to still another preferred embodiment of the present invention.

Still another preferred embodiment of the present invention will be described below with reference to FIG. 14. In FIG. 14, component members equivalent to those shown in the first to sixth preferred embodiments are rendered the same reference numerals and detailed explanation therefor is omitted. The present preferred embodiment is the same as the first to fourth and sixth preferred embodiments, except that: three transparent films are formed between the array substrate 1 and the sealing member 3, the metal wire 4 in the circumferential portion (sealing portion) of the array substrate and the gate lines 23 are provided in the same layer, the gate insulating film 15 is provided as the first transparent film on and over the metal wire 4, and the lower interlayer insulating film 25 and the upper interlayer insulating film 26 respectively constitute the second and third transparent films and serve as the interlayer insulating films covering the TFT 13.

Also in the present preferred embodiment, the plurality of transparent films are provided, so that the total film thickness of the transparent films can be thick as described above. Further, the transparent films can be formed in the process of forming the TFT 13 in the array substrate 1.

FIG. 14 is a cross sectional view schematically illustrating the structure of main parts of a liquid crystal display device according to the present preferred embodiment. As shown in FIG. 14, the liquid crystal display device according to the present preferred embodiment is arranged such that three transparent films are provided between the metal wires 4 and the sealing member 3. The metal wires 4 are connected to the gate lines 23 formed in the array substrate 1 and constituted by a gate metal. The three transparent films are made up of (i) a transparent film, which is the gate insulating film 15 and is made of silicon nitride (SiNx), (ii) a transparent film, which is the lower interlayer insulating film 25 and is made of silicon nitride (SiNx), and (iii) a transparent film, which is the upper interlayer insulating film 26 and is made of an acryl-based resin. The gate insulating film 15, the lower interlayer insulating film 25, and the upper interlayer insulating film 26 are provided in this order from the substrate 1A.

The following explains a method for manufacturing the array substrate 1. The method is according to the present preferred embodiment.

First, the gate lines 23 and the auxiliary capacitor lines 19 are formed on the transparent substrate 1A as follows. That is, sputtering is carried out so as to form a metal film such as a Ti/Al/Ti film stack. Next, a resist is provided on the metal film, and a resist pattern is formed through photolithography. Thereafter, the metal film is subjected to dry etching using an etching gas such as a chlorine-based gas. In the dry etching, the resist pattern is used as a mask. As a result of the dry etching, the metal film is patterned. Then, the resist is removed. In this way, the gate lines 23 and the auxiliary capacitor lines 19 are formed simultaneously on the substrate 1A. At the same time as the formation of the gate lines 23 and the auxiliary capacitor lines 19, the metal wires 4 are formed from the metal film in the circumferential portion of the substrate 1A (the circumferential portion of the array substrate 1) so as to be connected to the gate lines 23.

Thereafter, the gate insulating film 15 made of silicon nitride (SiNx) or the like, the active semiconductor layer 27 made of amorphous silicon or the like, a low-resistance semiconductor layer made of amorphous silicon to which phosphorous or the like is doped and constituting the n type semiconductor layers 24 are formed in accordance with the CVD. The gate insulating film 15 is formed to extend to the circumferential portion of the substrate 1A such that the metal wires 4 are covered with the gate insulating film 15. The circumferential portion is the region (sealing portion) to which the sealing member 3 is to be applied. The gate insulating film 15 thus formed is used as not only the gate insulating film in the TFT 13 but also the transparent film (first transparent film) covering the metal wires 4.

Thereafter, the source lines 22, the source electrodes 17, the drain extending electrodes 18, and the drain electrodes 16 are formed as follows. That is, sputtering is carried out so as to form a metal film such as an Al/Ti film stack. Next, a resist is provided on the metal film, and a resist pattern is formed through photolithography. Thereafter, the metal film is subjected to dry etching using an etching gas such as a chlorine-based gas. In the dry etching, the resist pattern is used as a mask. As a result of the dry etching, the metal film is patterned. Then, the resist is removed. In this way, the source lines 22, the source electrodes 17, the drain extending electrodes 18, and the drain electrodes 16 are formed simultaneously on the substrate 1A.

Next, in order to separate the source and the drain (in order to form the channel), the low-resistance semiconductor layer made of amorphous silicon or the like to which phosphorous or the like has been doped is subjected to dry-etching using an etching gas (concretely, chlorine gas) such as a chlorine-based gas, with the result that the TFT 13 is formed.

Thereafter, the lower interlayer insulating film 25 made of silicon nitride (SiNx) or the like is formed on the gate insulating film 15 in accordance with the CVD so as to cover the TFT 13. The lower interlayer insulating film 25 is provided to extend to the region (sealing portion) to which the sealing member 3 is to be applied, i.e., to the circumferential portion of the substrate 1A, so as to cover the metal wires 4. The lower interlayer insulating film 25 thus provided is used as not only the channel protecting film of the TFT 13 but also the transparent film (second transparent film) covering the metal wires 4.

Next, the upper interlayer insulating film material consisting of the acryl-based photo curing resin or the like is applied onto the lower interlayer insulating film 25 by way of spin coating, thereby forming the upper interlayer insulating film 26 on the lower interlayer insulating film 25 so as to extend to the circumferential portion of the substrate 1A but so as to exclude the terminal sections. In other words, the upper interlayer insulating film 26 is formed so as to cover the metal wires 4 and extend to the circumferential portion of the substrate 1A, i.e., the portion that is to be the region (sealing portion) to which the sealing member 3 is to applied, but so as to exclude the terminal sections. The upper interlayer insulating film 26 thus formed is used as not only the interlayer insulating film for separating the TFT 13 and the pixel electrode 21 from each other, but also the transparent film (third transparent film) covering the metal wire 4.

Thereafter, in the same manner as described in the sixth preferred embodiment, the pixel regions are formed and the region to be the sealing portion is formed in the circumferential portion of the array substrate 1.

In the present preferred embodiment, the metal wires (light blocking sections, first light blocking sections) 4 are metal wires connected to the gate lines 23; however, the present invention is not limited to this. The metal wires 4 may be, e.g., dummy patterns formed in the layer in which the gate lines 23 are formed.

Eight Preferred Embodiment

Figure 15:
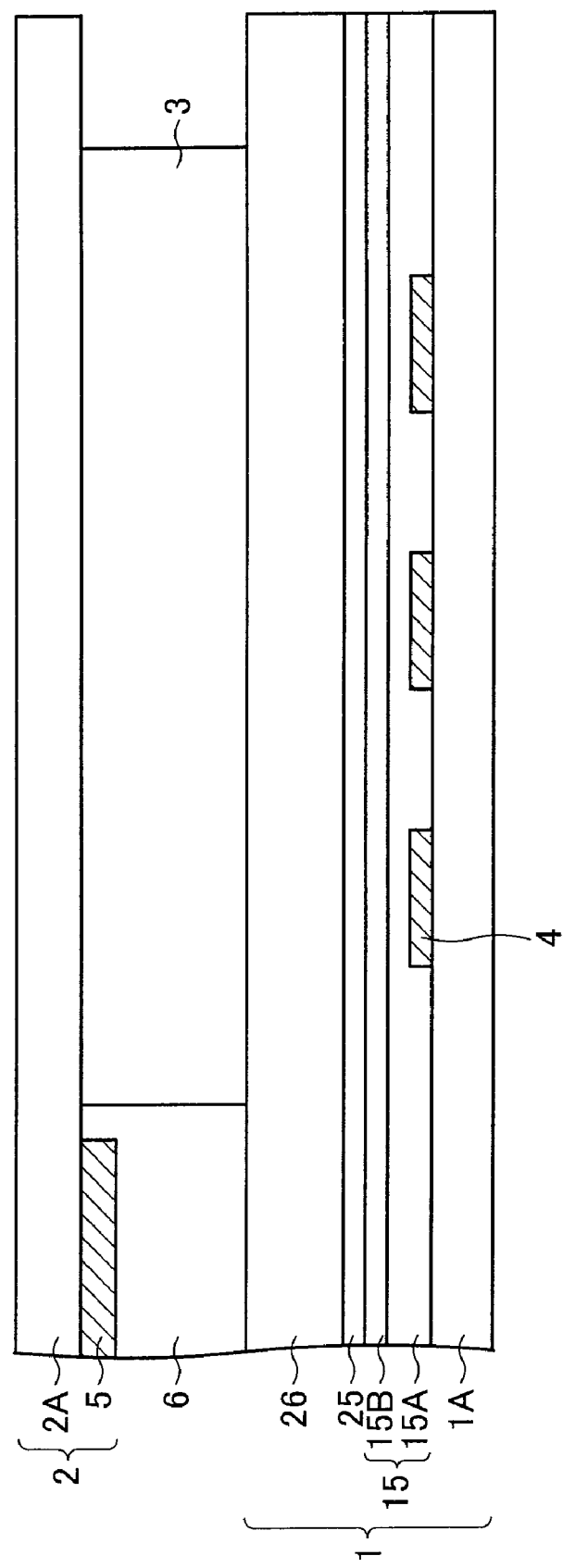
FIG. 15 is a cross sectional view illustrating the structure of main parts of a liquid crystal display device according to yet another preferred embodiment of the present invention.

Yet another preferred embodiment of the present invention will be described below with reference to FIG. 15. In FIG. 15, component members equivalent to those shown in the first to seventh preferred embodiments are rendered the same reference numerals and detailed explanation therefor is omitted. The present preferred embodiment is the same as the first to fourth, sixth and seventh preferred embodiments, except that: four transparent films are formed between the array substrate 1 and the sealing member 3, the metal wires 4 in the circumferential portion (sealing portion) of the array substrate 1 and the gate lines 23 are provided in the same layer, two gate insulating films of the four transparent films are provided on the gate lines 23 and the metal wires 4, and the lower interlayer insulating film 25 and the upper interlayer insulating film 26 serve as the interlayer insulating films covering the TFT 13 and respectively constitute the third and fourth transparent films, which cover the metal wires 4 with the two gate insulating films interposed therebetween.

FIG. 15 is a cross sectional view schematically illustrating the structure of main parts of a liquid crystal display device according to the present preferred embodiment. As shown in FIG. 15, the liquid crystal display device according to the present preferred embodiment is arranged such that the four transparent films are provided between the metal wires 4 and the sealing member 3. The metal wires 4 are connected to the gate lines 23 formed in the array substrate 1 and constituted by a gate metal. The four transparent films are made up of: (i)

a transparent film, which is a first gate insulating film 15a and made of an SOG material, (ii) a transparent film, which is a second gate insulating film 15b and is made of silicon nitride (SiNx), (iii) a transparent film, which is the lower interlayer insulating film 25 and is made of silicon nitride (SiNx), and (iv) a transparent film, which is the upper interlayer insulating film 26 and is made of an acryl-based resin. The first gate insulating film 15a, the second gate insulating film 15b, the lower interlayer insulating film 25, and the upper interlayer insulating film 26 are provided in this order from the substrate 1A.

Also in the present preferred embodiment, such a multilayer structure constituted by the plurality of transparent films makes it possible that the total film thickness of the transparent films becomes thick and that the transparent films are formed in the process of forming the TFT 13 in the array substrate 1. According to the present preferred embodiment, the SOG material is used for one of the transparent films, thereby allowing the transparent films to be flat. This makes it possible to secure the thicknesses of the transparent films provided between the sealing member 3 and the metal wires 4 that are the light blocking section, more surely as compared with the seventh preferred embodiment above.

The following explains a method for manufacturing the gate insulating film 15 in the array substrate 1. As described above, in the present preferred embodiment, the gate insulating films 15 has a two-layer structure made up of the first gate insulating film 15a and the second gate insulating film 15b.

First, the gate lines 23, the auxiliary capacitor lines 19, and the metal wires 4 connected to the gate lines 23 are formed on the transparent substrate 1A as follows. That is, sputtering is carried out so as to form a metal film such as a Ti/Al/Ti film stack. Next, a resist is provided on the metal film, and a resist pattern is formed through photolithography. Thereafter, the metal film is subjected to dry etching using an etching gas such as a chlorine-based gas. In the dry etching, the resist pattern is used as a mask. As a result of the dry etching, the metal film is patterned. Then, the resist is removed. In this way, the gate lines 23, the auxiliary capacitor lines 19, the metal wires 4 connected to the gate lines 23 and positioned in the circumferential portion of the substrate 1A (circumferential portion of the array substrate 1) are formed simultaneously on the substrate 1A.

Next, by using the spin coating method, the SOG material is applied so as to cover the gate lines 23, the auxiliary capacitor lines 19, and the metal wires 4, with the result that the first gate insulating film (planarizing film) 15a is formed on the gate lines 23, the auxiliary capacitor lines 19, and the metal wires 4. Then, a photo resist is applied onto the first insulating film 15a. Thereafter, the photo resist is exposed using a photo mask and is thereafter developed, with the result that a resist pattern is obtained. While using this resist pattern as a mask, dry etching is carried out so as to remove unnecessary portions of the first gate insulating film 15a. A specific example of such unnecessary portions is a portion above the terminal sections. The dry etching is carried out using, e.g., a mixture gas of tetrafluorohydrogen ($CF_4$) and oxygen ($O_2$). The first gate insulating film 15a thus formed is used as not only the gate insulating film in the TFT 13 but also the transparent film (first transparent film) covering the metal wires 4.

Thereafter, the second gate insulating film 15b made of silicon nitride (SiNx) or the like, the active semiconductor layer 27 made of amorphous silicon or the like, a low-resistance semiconductor layer made of amorphous silicon to which phosphorous or the like is doped and constituting the n type semiconductor layers 24 are formed in accordance with the CVD. The second gate insulating film 15b is formed to extend to the circumferential portion of the substrate 1A. The circumferential portion is the region (sealing portion) to which the sealing member 3 is to be applied. The second gate insulating film 15b thus formed is used as not only the gate insulating film in the TFT 13 but also the transparent film (second transparent film) covering the metal wires 4.

Steps thereafter in manufacturing the array substrate 1 are the same as those in the sixth and seventh preferred embodiments. For this reason, explanation therefor is omitted here.

In the present preferred embodiment, the metal wires (light blocking sections, first light blocking sections) 4 are metal wires connected to the gate lines 23; however, the present invention is not limited to this. The metal wires 4 may be, e.g., dummy patterns formed in the layer in which the gate lines 23 are formed.

Ninth Preferred Embodiment

Figure 16:
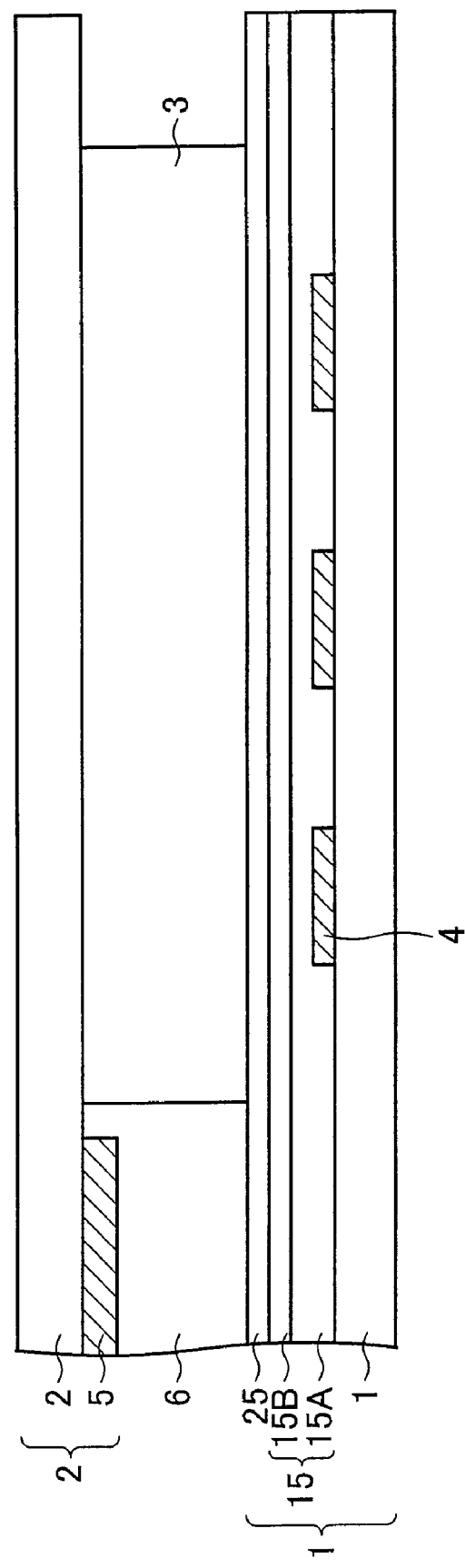
FIG. 16 is a cross sectional view illustrating the structure of main parts of a liquid crystal display device according to still another preferred embodiment of the present invention.

Still another preferred embodiment of the present invention will be described below with reference to FIG. 16. In FIG. 16, component members equivalent to those shown in the first to eight preferred embodiments are rendered the same reference numerals and detailed explanation therefor is omitted. The present preferred embodiment is the same as the first to fourth and sixth to eighth preferred embodiments, except that: three transparent films are formed between the array substrate 1 and the sealing member 3, the metal wires 4 in the circumferential portion (sealing portion) of the array substrate 1 and the gate lines 23 are provided in the same layer, two gate insulating films of the three transparent films are provided on the gate lines 23 and the metal wires 4, and the lower interlayer insulating film 25 serve as the interlayer insulating film covering the TFT 13 and constitute the third transparent film, which covers the metal wires 4 with the two gate insulating films interposed therebetween.

FIG. 16 is a cross sectional diagram schematically illustrating the structure of main parts of a liquid crystal display device according to the present preferred embodiment. As shown in FIG. 16, the liquid crystal display device according to the present preferred embodiment is arranged such that the three transparent films are provided between the metal wires 4 and the sealing member 3. The metal wires 4 are connected to the gate lines 23 formed in the array substrate 1 and constituted by a gate metal. The three transparent films are made up of (i) a transparent film, which is a first gate insulting film 15a and is made of an SOG material, (ii) a transparent film, which is a second gate insulating film 15b and is made of silicon nitride (SiNx), and (iii) a transparent film, which is the lower interlayer insulating film 25 and is made of silicon nitride (SiNx).

Also in the present preferred embodiment, such a multilayer structure constituted by the plurality of transparent films, especially by the gate insulating films, makes it possible that the total film thickness of the transparent films becomes thick.

A difference between the present preferred embodiment and the eighth preferred embodiment above lies in that only one interlayer insulating film is provided in the present preferred embodiment.

The following explains a method for forming the interlayer insulating film in the array substrate 1. Note that the structure other than the interlayer insulating film is the same as the eighth preferred embodiment, so that explanation for processes other than the process of forming the interlayer insulating film is omitted in the present preferred embodiment.

In the present preferred embodiment, as the interlayer insulating film, an insulating film (channel protecting film) made of silicon nitride (SiNx) or the like is formed in accordance with the CVD. Specifically, in the present preferred embodiment, the lower interlayer insulating film 25 described above in the eighth preferred embodiment is formed as the interlayer insulating film on the gate insulating film 15 so as to cover the TFT 13. The interlayer insulating film, i.e., the lower interlayer insulating film 25 is formed so as to cover the metal wires 4 with the gate insulating film 15 interposed therebetween, and so as to extend to the circumferential portion of the substrate 1A. The circumferential portion thereof is the region (sealing portion) to which the sealing member 3 is to be applied. The lower interlayer insulating film 25 thus formed is used as not only the channel protecting film of the TFT 13 but also the transparent film (third transparent film) covering the metal wires.

Next, a photo resist is applied to the insulating film (lower interlayer insulating film 25), and then the photo resist is exposed using a photo mask and is developed, with the result that a resist pattern is obtained. While using the resist pattern as a mask, dry etching is carried out so as to remove, from the insulating film (lower interlayer insulating film 25), a portion that is to be a contact hole for use in electrically connecting the drain extending electrode 18 to the pixel electrode 21. The dry etching can be carried out using, e.g., a mixture gas of tetrafluorohydrogen ($CF_4$) and oxygen ($O_2$).

In the present preferred embodiment, the metal wires (light blocking sections, first light blocking sections) 4 are metal wires connected to the gate lines 23; however, the present invention is not limited to this. The metal wires 4 may be, e.g., dummy patterns formed in the layer in which the gate lines 23 are formed.

As described above, the aforesaid liquid crystal display device includes: a first substrate and a second substrate, provided face to face with each other; and a liquid crystal layer provided between the first substrate and the second substrate, the first substrate and the second substrate being bonded together by a sealing member containing a photo curing material (a), a light blocking section (A) being provided in a part of an opposed surface of the first substrate to the second substrate, a transparent film being provided between the sealing member and the light blocking section (A).

Accordingly, when light is irradiated via the backside surface of the first substrate, the light-blocked region (shaded portion) does not emerge in the sealing member but emerges within the transparent film. As such, the light blocking section does not cause emergence of the light-blocked region in the sealing member (i.e., the sealing member is entirely irradiated with light) unlike the conventional techniques, so that the sealing member is cured sufficiently. As such, the above arrangement is very simple but efficiently prevents poor curing of the sealing member. As a result, it is possible to provide such a liquid crystal display device that has a high display quality because the sealing member, especially, the contact portion of the sealing member with the liquid crystal layer is prevented from being poorly cured (the sealing member is substantially never poorly cured, preferably is completely cured) and the problem occurring due to poor curing of the sealing member is therefore solved.

The present invention is effective for the liquid crystal display device arranged such that the sealing member is provided uninterruptedly in the form of a frame and the liquid crystal layer is formed by providing and sealing the liquid crystal between the first substrate and the second substrate by using the sealing member, and is especially effective for the liquid crystal display device employing the liquid crystal dropping method.

When a liquid crystal and an uncured sealing member make contact with each other, an ingredient of the uncured sealing member is melted into the liquid crystal, with the result that spots appear. In cases where the liquid crystal layer is provided by using the liquid crystal dropping method, it is necessary to cure the sealing member fast for prevention of the spots. In preventing the ingredient of the sealing member from being melted into the liquid crystal layer due to poor curing of the sealing member, it is important that the light-blocked region formed by the light blocking section (A) does not exist in the sealing member, especially, the contact portion of the sealing member with the liquid crystal layer. Therefore, as described above, the present invention is particularly preferable for a liquid crystal display device employing the liquid crystal dropping method.

From the shape (arrangement) of the sealing member, it is possible to judge whether the liquid crystal display device employs the liquid crystal dropping method or the liquid crystal dropping adhesion method using the liquid crystal dropping method.

The transparent film may be made up of one layer or a plurality of layers. In other words, the transparent film may have a multi-layer structure in which a plurality of transparent films each made of a material (transparent material) different from those of adjacent transparent film(s) are formed.

The transparent film thus made up of the plurality of layers is formed, so that the total film thickness of the transparent layers (i.e., the total film thickness of the transparent films) can be thick and the transparent film can be formed in a process of forming an active element (switching element) such as a TFT in the first substrate.

It is preferable to arrange the liquid crystal display device such that: Formula (1) is satisfied where the light blocking section (A) has a width W, the transparent film is made up of m layers ($1 \leq m$), a k-th layer of the transparent film counted from a side in which the first substrate is provided has a refractive index of nk ($1 \leq k \leq m$), and the k-th layer has a film thickness dk:

$$W \leq \sum_{k=1}^{m} 2 \times d_k \times \sqrt{\frac{1}{n_k^2 - 1}} \quad (1)$$

According to the arrangement, with regard to the width W of the light blocking section (A), the number of layers of the transparent film, the refractive index thereof, and the film thickness thereof are set so as to satisfy Formula (1) above. With this, the light-blocked region formed by the light blocking section (A) exists only in the transparent film. That is, the light-blocked region does not exist in the sealing member. With this, the light coming via the backside surface of the first substrate travels around the light-blocked region formed in the transparent film, with the result that the sealing member is entirely irradiated with the light sufficiently. This makes it unnecessary to irradiate the light for a long time so as not to cause poor curing of the sealing member, unlike the conventional techniques. As a result, it is possible to prevent increase of light irradiation energy.

Further, even if the specification of the liquid crystal display device is changed, it is possible to quickly design the liquid crystal display device by carrying out settings so as to satisfy Formula (1). Note that the aforesaid "width W of the light blocking part (A)" refers to the width of the short side of the light blocking part (A), which short side is in parallel with the first substrate.

Further, it is preferable to arrange the liquid crystal display device such that: Formula (2) is satisfied where the light blocking section (A) has a width W, the transparent film is made up of m layers ($1 \leq m$), a k-th layer of the transparent film counted from a side in which the first substrate is provided has a refractive index of nk ($1 \leq k \leq m$), and the k-th layer has a film thickness dk:

$$W \leq \sum_{k=1}^{m} 2 \times d_k \times \sqrt{\frac{0.88}{n_k^2 - 0.88}} \quad (2)$$

Generally speaking, as the incident angle of light entering a glass substrate is larger, the incoming light is reflected by the surface of the glass substrate with ease, with the result that the intensity of the incoming light passing through the glass substrate is attenuated. This requires increase of time of the irradiation of the light to some extent, thus resulting in increase of light irradiation energy.

However, according to the above arrangement, the number of layers of the transparent film, the refractive index thereof, and the film thickness thereof are set so as to satisfy Formula (2). With this, even in cases where the first substrate is a substrate made of glass (glass substrate) and the incident angle of the light is small, the light coming via the backside surface of the first substrate travels around the light-blocked region formed in the transparent film, with the result that the sealing member is entirely irradiated with light sufficiently. This makes it possible to prevent poor curing of the sealing member, even when the light is not irradiated for a longer period of time.

Further, it is preferable to arrange the liquid crystal display device such that: a film thickness of the transparent film from a base portion of the light blocking section (A) is as high as or higher than a height of a light-blocked region from the base portion of the light blocking section (A), which light-blocked region is a region in which light coming via a backside surface of the first substrate is blocked by the light blocking section (A).

For example, in cases where the light blocking section (A) is formed directly on the transparent substrate (first substrate) serving as a base substrate, it is preferable that a distance from (i) the opposed surface of the first substrate with respect to the second substrate (hereinafter, referred to as "the opposed surface of the first substrate") to (ii) the surface of the transparent film, i.e., a space between the sealing member and the opposed surface of the first substrate be equal to or longer than a distance of the light-blocked region from the opposed surface of the first substrate with respect to the second substrate. Note that a distance in which the transparent film extends from the opposed surface of the first substrate (i.e., distance between the sealing member and the opposed surface of the first substrate) is equal to or longer than a distance in which the light-blocked region emerging when the light is irradiated via the backside surface of the first substrate extends from the opposed surface of the first substrate. Here, the wording "distance in which the light-blocked region extends from the opposed surface" refers to a length from (i) the opposed surface of the first substrate to (ii) the top of the light-blocked region (portion furthest away from the opposed surface thereof in the normal direction of the opposed surface of the first substrate).

According to the above arrangement, there is a sufficient space between (i) the region in which the light is blocked by the light blocking section (A) and (ii) the sealing member, so that the light is irradiated onto the sealing member sufficiently. This sufficiently prevents poor curing of the sealing member.

Further, it is preferable to arrange the liquid crystal display device such that: the transparent film has a portion that makes contact with the sealing member and that is provided with an irregularity for dispersing light.

According to the above arrangement, the irregularity is formed in the contact portion of the transparent film with the sealing member, so that the light entering the transparent film via the backside surface of the first substrate is refracted by the irregularity in various directions and is accordingly dispersed. In other words, according to the above arrangement, light refraction efficiency is better than that in cases where no irregularity is formed, with the result that the light is irradiated onto a wider area of the sealing member. Accordingly, even when the transparent film is so thin that the light does not reach the sealing member sufficiently, the irregularity refracts and disperses the light, with the result that the sealing member is sufficiently irradiated with the light. This makes it possible to prevent the sealing member from remaining uncured in the liquid crystal display device. Note that the wording "irregularity" herein refers to "not smooth".

Further, it is preferable to arrange the liquid crystal display device such that: the transparent film is made up of one or more layers, and the transparent film has at least one layer made of a material (b) containing an organic compound. It is more preferable that the material (b) contain a resin.

According to the above arrangement, at least one layer of the transparent film is made of the material (b) containing the organic compound, especially, is made of the material containing the resin. This makes it possible for the transparent film to have a thick film thickness. For example, a resin having a high viscosity is adopted, is applied onto a substrate with the use of a spin coater or the like, and is cured by light and/or heat, with the result that a transparent having a thick film thickness is formed. Such a transparent film having the thick film thickness allows the light to travels around toward the sealing member sufficiently. This makes it possible to prevent the poor curing of the sealing member, thereby improving reliability of the manufactured product. In this case, it is preferable that the transparent film have at least one layer that is made of the material (b) containing the resin and that has a film thickness of not less than 2 μm but not more than 4 μm.

It is preferable to arrange the liquid crystal display device such that: the resin is at least one selected from a group consisting of an acryl resin, an epoxy resin, polyimide, polyurethane, and polysiloxane.

Each of these resins has a refractive index relatively smaller than that of a glass substrate, and is a general-purpose resin generally used for an interlayer insulating film or the like in the liquid crystal display device. Therefore, the material containing any of these resins as the organic compound is beneficial in terms of process and cost. For example, according to the above arrangement, the transparent film can be formed at one time with the formation of the interlayer insulating film or the like in the liquid crystal display device. As such, no additional step of forming the transparent film is required, and the manufacturing steps are simplified.

It is preferable to arrange the liquid crystal display device such that: the transparent film is made up of one or more layers, and the transparent film has at least one layer made of a material containing silicon nitride.

According to the above arrangement, an inorganic film made of silicon nitride can be used as the transparent film. The inorganic film is used in a normal liquid crystal display device. This makes it possible to form the transparent film at one time with the formation of the inorganic film. As a result, no additional step of forming the transparent film is required, and the manufacturing steps are simplified.

It is preferable to arrange the liquid crystal display device such that: the transparent film is made up of one or more layers, and the transparent film has at least one layer made of a material containing silicon oxide.

According to the above arrangement, at least one layer of the transparent film is made of the material containing silicon oxide, which is used in a general liquid crystal display device as, e.g., a passivation film or a hard coat material. This makes it possible that the transparent film is formed at one time with formation of, e.g., the passivation film or the like in the liquid crystal display device. Therefore, no additional step of forming the transparent film is required, and the manufacturing steps are simplified.

Further, it is preferable to arrange the liquid crystal display device such that: the transparent film is made up of one or more layers, and the transparent film has at least one layer made of a material containing a spin-on-glass (SOG) material (the layer may be made of an SOG material).

Generally, the spin-on-glass is a vitreous material from which a film can be formed in a liquid crystal display device by using the spin coating method.

According to the above arrangement, at least one layer of the transparent film is made of the spin-on-glass (SOG) material, so that the transparent film can be formed by using the spin coating method. Further, the use of the SOG material for the transparent film makes it possible to render the transparent film flat. Accordingly, it is possible to more surely secure the thickness of the transparent film provided between the sealing member and the light blocking section (A), as compared with a case where other inorganic material is used for the material for the transparent film. In this case, it is preferable that the transparent film have at least one layer that is made of the material (b) containing the spin-on-glass material and that has a film thickness of not less than 2 μm but not more than 4 μm.

Further, it is preferable to arrange the liquid crystal display device such that: the transparent film is made up of one or more layers, and the transparent film has at least one layer made of a transparent electrode material.

According to the above arrangement, the transparent electrode material generally used in a liquid crystal display device can be used as at least one layer of the transparent film. Examples of such a transparent film material include indium tin oxide (ITO) and indium zinc oxide (IZO). Accordingly, the transparent film can be formed in the liquid crystal display device at one time with formation of a transparent film. Therefore, no additional step of forming the transparent film is required, so that manufacturing efficiency is improved.

It is preferable to arrange the liquid crystal display device such that: the transparent film includes (i) at least one layer containing an inorganic compound and (ii) at least one layer containing an organic compound. In this case, it is preferable that the layer constituting the transparent film and containing the inorganic compound be a lowest layer.

According to the above arrangement, an interlayer insulating film for protecting an active element (switching element) such as a TFT can be used as the transparent film. Therefore, the transparent film can be formed at one time with formation of the interlayer insulating film. Therefore, no additional step of forming the transparent film is required, so that manufacturing efficiency is improved.

In this case, the interlayer insulating film formed on the TFT and containing the inorganic compound functions as a channel protecting layer. Therefore, when an active semiconductor layer forming a channel of the TFT makes contact with the layer (interlayer insulating film) containing the organic compound, the OFF property of the TFT and long-term reliability thereof are deteriorated. Therefore, it is desirable that an interlayer insulating film containing an inorganic compound be provided between the TFT and the interlayer insulating film containing the organic compound. When such an interlayer insulating film containing the inorganic compound is used as the lowest layer, i.e., is provided between the light blocking section (A) and the layer containing the organic compound, it is possible to (i) restrain deterioration of, e.g., the OFF property of the TFT and the long-term reliability thereof, and (ii) easily obtain the liquid crystal display device, which allows the transparent film to be formed with ease, prevents appearing of spots, has a simple structure, and has a high display quality.

Further, in this case, it is preferable that the transparent film have a total film thickness of not less than 2 μm but not more than 4 μm. Alternatively, it is preferable that the transparent film include at least one layer containing the organic compound and a resin, and the layer containing the resin have a film thickness of not less than 2 μm but not more than 4 μm. It is more preferable that the transparent film include at least one layer containing the organic compound and a resin, the layer containing the resin has a film thickness of not less than 2 μm but not more than 4 μm, and the transparent film have a total film thickness of not more than 4 μm.

Further, it is preferable to arrange the liquid crystal display device such that: the transparent film is made up of one or more layers, and the transparent film has at least one layer that is an interlayer insulating film (i.e., serving also as an interlayer insulating film). It is more preferable to arrange the liquid crystal display device such that: the transparent film has at least one layer serving also as the interlayer insulating film, containing a resin, and having a film thickness of not less than 2 μm but not more than 4 μm.

According to the above arrangement, at least one layer of the transparent film is the interlayer insulating film, so that the interlayer insulating film for protecting the active element (switching element) such as the TFT can be used as the transparent film, as described above. This makes it possible to form the transparent film at one time with the formation of the interlayer insulating film. Therefore, no additional step of forming the transparent film is required, so that manufacturing efficiency is improved.

It is preferable to arrange the liquid crystal display device such that: the transparent film is made up of one or more layers, and the transparent film has at least one layer that is a gate insulating film.

According to the above arrangement, at least one layer of the transparent film is the gate insulating film, so that the gate insulating film for protecting the active element (switching element) such as the TFT can be used as the transparent film, as described above. This makes it possible to form the transparent film at one time with the formation of the gate insulating film. Therefore, no additional step of forming the transparent film is required, so that the manufacturing steps are simplified.

Further, it is preferable to arrange the liquid crystal display device such that: the transparent film is made up of one or more layers, and the transparent film has at least one layer that is a planarizing film.

According to the above arrangement, at least one layer of the transparent film is the planarizing film, so that the planarizing film for making the liquid crystal layer flat can be used as the transparent film. Such a planarizing film is used to (i) prevent the liquid crystal of the liquid crystal layer from being out of alignment, and (ii) uniformize the thickness of the pixel region in the liquid crystal display device for the sake of preventing luminance unevenness in the liquid crystal display device. It is possible to form the transparent film at one time with the formation of such a planarizing film. Therefore, no additional step of forming the transparent film is required, so that manufacturing efficiency is improved.

It is preferable to arrange the liquid crystal display device such that: the transparent film has a refractive index not more than a refractive index of the first substrate. It is more preferable that the transparent film have a refractive index smaller than a refractive index of the first substrate. For example, it is preferable that the transparent film be made up of one or more layers, and the transparent film have at least one layer having a refractive index not more than a refractive index of the first substrate. It is more preferable that the transparent film have at least one layer having a refractive index smaller than a refractive index of the first substrate. Further, it is preferable to arrange the liquid crystal display device such that: the transparent film has at least one layer made of a material containing an organic compound, and the layer made of the material containing the organic compound has a refractive index not more than the refractive index of the first substrate. It is more preferable that the layer made of the material containing the organic compound have a refractive index smaller than the refractive index of the first substrate.

Snell's law (law of refraction) normally works in the transparent film and the first substrate. Specifically, assume that the refractive index of the substrate 1A is na, the refractive index of the transparent film 7 is nb, the incident angle of the light entering the transparent film is θi, and the refraction angle thereof is θr. Irrespective of the incidence angle, $\sin \theta i / \sin \theta r = nb/na$ is always satisfied.

According to the above arrangement, the refractive index of the transparent film is not more than, preferably is smaller than, the refractive index of the first substrate. Therefore, according to Snell's law, the refractive angle of the transparent film is larger than the incident angle of the light. Namely, the light is refracted to reach the sealing member 3 more. This reduces the light-blocked region, with the result that the sealing member has a larger area irradiated with the light.

Further, the liquid crystal display device is arranged such that the transparent film is made up of one or more layers, and it is preferable that the transparent film have a total film thickness of not less than 1.5 μm. It is also preferable that the transparent film have a total film thickness of not less than 1.7 μm. In consideration of margin, it is more preferable that the transparent film have a total film thickness of not less than 2 μm. When the transparent film has a total film thickness of not less than 1.5 μm, more preferably not less than 1.7 μm, further preferably not less than 2 μm, the light blocking section (A) having a width of 3 μm, which is based on resolution limit for wires formed in a process of manufacturing a general liquid crystal display device, does not prevent the light from being irradiated onto the sealing member sufficiently. Even if the light blocking section (A) has a width of not less than 3 μm, the transparent film allows the light to be irradiated onto the sealing member more efficiently, so that it is possible to restrain poor curing of the sealing member more efficiently as compared with a case where no transparent film is provided.

Further, it is preferable to arrange the liquid crystal display device such that the transparent film is made up of one or more layers, and each of the one or more layers of the transparent film has a film thickness of not more than 4 μm, more preferably the transparent film has a total film thickness of not more than 4 μm.

For example, in cases where the aforesaid transparent film is used as the interlayer insulating film used in the liquid crystal display device and has an irregularity, display unevenness possibly occurs in the liquid crystal display device. Especially, consider a where the transparent film is a layer containing an organic compound such as an acryl resin or a layer (SOG layer) made of an SOG material. In this case, if such a transparent film is so formed as to be thick by carrying out application once, the display unevenness due to the irregularity is more likely to occur. However, when the film thickness of each layer of the transparent film, preferably the total film thickness of the transparent film, is not more than 4 μm, the irregularity occurring due to application unevenness is reduced. This makes it difficult to recognize the display unevenness. According to the above arrangement, the film thickness of the transparent film is not more than 4 μm, it is possible to maintain flatness of the transparent film, thereby preventing the display unevenness from occurring in the liquid crystal display device.

Therefore, the liquid crystal display device is arranged such that the transparent film is made up of one or more layers, and it is preferable that the transparent film have a total film thickness of not less than 1.5 μm but not more than 4 μm. It is especially preferable that the transparent film have a total film thickness of not less than 2 μm but not more than 4 μm.

Further, it is preferable to arrange the liquid crystal display device such that: the light blocking section (A) is provided in a part of the opposed surface of the first substrate to the second substrate, which part includes a portion located below a boundary between the sealing member and the liquid crystal layer, and the transparent film is formed at least between (i) a portion at which the sealing member makes contact with the liquid crystal layer and (ii) the light blocking section (A).

According to the above arrangement, the transparent film is provided between (i) the portion at which the sealing member makes contact with the liquid crystal layer and (ii) the light blocking section (A), so that the portion at which the sealing member makes contact with the liquid crystal layer is surely cured when light is irradiated via the backside surface of the first substrate. This makes it possible to prevent the ingredient of the sealing member from being melted from an uncured portion to the liquid crystal layer. Further, when adhesion strength in the sealing is sufficient, an uncured portion of the sealing member does not make contact with the liquid crystal, so that no adverse effect acts on the reliability of the manufactured product. This makes it possible to provide the manufactured product having a high quality.

The present invention is especially effective in cases where light is irradiated at least via the first substrate so as to cure the sealing member.

For example, in cases where the second substrate is provided with a light blocking section (B) such as a black matrix and the light blocking section (B) is provided in such a position that at least a part of the light blocking section (B) overlaps with the sealing member, light is irradiated at least via the first substrate so as to cure the sealing member.

In this case, as described above, the transparent film is provided between the sealing member and the light blocking section (A) provided in the first substrate, so that no light-blocked region formed by the light blocking section (A) does not exist in the sealing member. This allows the sealing member to be cured sufficiently. In this way, it is possible to prevent poor curing of the sealing member.

Whether or not the sealing member of the liquid crystal display device is cured by irradiating light via the first substrate can be judged by, e.g., judging (i) a type of the sealing member and (ii) a layer structure in a sealing portion of the sealing member in the liquid crystal display device. In other words, for example, in cases where the light blocking section (B) is formed on the second substrate and at least a part of the light blocking section (B) overlaps with the sealing member containing the photo curing material (a) as described above, it is necessary to irradiate light to the sealing member at least via the first substrate so as to cure the sealing member. In this case, it is possible to judge that the light is irradiated at least via the first substrate so as to cure the sealing member.

In cases where the light blocking section (B) is a black matrix as described above, it is possible to prevent light of backlight from leaking from the circumferential portion. This is effective for narrowing the frame region.

Note that the present invention is applicable to a general case where a pattern (construction) having a light blocking property or rarely allowing light to pass therethrough is provided in the sealing portion. A specific example of the light blocking section (A) is at least one selected from a group consisting of a metal wire, a dummy pattern made of a metal, and a black matrix.

The dummy pattern is provided in, e.g., a part in which no metal wire is provided, so as to uniformize a gap in the sealing portion. Further, the dummy pattern is usable in cases where the metal wire is too thick and it is therefore impossible to irradiate light to the sealing member sufficiently. An example of such a case is a case where light is irradiated via a black matrix provided with an opening portion having a shape of slit.

Further, as described above, a method for manufacturing the liquid crystal display device includes the step of forming the transparent film at least on the light blocking section provided in the opposed surface of the first substrate, before the step of providing the sealing member of photo curing type in the circumferential portion of the first substrate, in a part of which the light blocking section is provided.

In other words, as described above, a method for manufacturing the liquid crystal display device, which includes a first substrate and a second substrate provided face to face with each other and a liquid crystal layer provided between the first substrate and the second substrate, the first substrate and the second substrate being bonded together by a sealing member containing a photo curing material (a), includes: a sealing member providing step of providing the sealing member containing the photo curing material, in a circumferential portion of the first substrate having an opposed surface to the second substrate, which opposed surface has a part in which a light blocking section (A) is formed; a liquid crystal layer forming step of forming the liquid crystal layer in a region surrounded by the sealing member; and a substrate bonding step of bonding the first substrate and the second substrate together by the sealing member, the method, further including: a transparent film forming step of forming, before the sealing member providing step, a transparent film at least on the light blocking section (A) provided in the opposed surface of the first substrate.

Therefore, when light is irradiated so as to cure the sealing member, the light travels around toward the sealing member, with the result that the sealing member is irradiated with light sufficiently. Accordingly, unlike the conventional techniques, it is not necessary to irradiate the light for a long time so as to prevent poor curing of the sealing member. This reduces light irradiation energy and improves manufacturing efficiency. As such, the above method is very simple but efficiently prevents poor curing of the sealing member. According to the above method, it is therefore possible to provide such a liquid crystal display device that has a high display quality because the sealing member, especially, the contact portion of the sealing member with the liquid crystal layer is prevented from being poorly cured (the sealing member is substantially never poorly cured, preferably is completely cured) and the problem occurring due to poor curing of the sealing member is therefore solved.

Further, as described above, the present invention is especially effective in cases where the method further includes a sealing member curing step of irradiating, after the substrate bonding step, light to the sealing member via the first substrate so as to cure the sealing member.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

A liquid crystal display device of the present invention is preferably applicable to use such as a mobile terminal.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A liquid crystal display device, comprising:
an array substrate and a color filter substrate arranged to face each other;
a liquid crystal layer provided between the array substrate and the color filter substrate;
a sealing member arranged to continuously surround the liquid crystal layer and arranged to join the array substrate and the color filter substrate together;
a light blocking section provided in a portion of a surface of the array substrate; and
a transparent film provided on the array substrate and between the sealing member and the light blocking section; wherein
the transparent film includes at least two layers made of different materials, each of the at least two layers are disposed between the sealing member and the light blocking section; and
Formula (1) is satisfied where the light blocking section has a width W, the transparent film is made up of m layers ($1<m$), a k-th layer of the transparent film counted from a side in which the array substrate is provided has a refractive index of $n_k$ ($1 \leq k \leq m$), and the k-th layer has a film thickness $d_k$:

$$W \leq \sum_{k=1}^{m} 2 \times d_k \times \sqrt{\frac{1}{n_k^2 - 1}}. \tag{1}$$

2. The liquid crystal display device as set forth in claim 1, wherein the light blocking section is defined by signal lines.

3. The liquid crystal display device as set forth in claim 1, wherein the light blocking section is arranged to overlap only a portion of the sealing member.

4. The liquid crystal display device as set forth in claim 1, wherein one of the least two layers of the transparent film is made of silicon nitride or silicon oxide.

5. The liquid crystal display device as set forth in claim 1, wherein the at least two layers of the transparent film include different kinds of inorganic layers.

6. The liquid crystal display device as set forth in claim 1, wherein one of the at least two layers of the transparent film is made of a material containing an organic compound.

7. The liquid crystal display device as set forth in claim 6, wherein the material containing an organic compound includes a resin.

8. The liquid crystal display device as set forth in claim 7, wherein the resin is at least one selected from a group consisting of an acryl, an epoxy resin, polyimide, polyurethane, and polysiloxane.

9. The liquid crystal display device as set forth in claim 1, wherein at least one of the at least two of layers of the transparent film includes a transparent electrode material and is located closest to the sealing member.

10. The liquid crystal display device as set forth in claim 9, wherein at least one of the at least two of layers of the transparent film includes at least one layer containing an inorganic compound and is a lowest layer of the transparent film located on the array substrate.

11. The liquid crystal display device as set forth in claim 1, wherein the light blocking section is arranged to protrude from a portion of a border between the liquid crystal layer and the sealing member into an area in which the sealing member is located when viewed from above.

12. The liquid crystal display device as set forth in claim 1, wherein the sealing member includes a photocurable material.

13. The liquid crystal display device as set forth in claim 1, wherein the light blocking section is patterned.

14. The liquid crystal display device as set forth in claim 1, wherein the at least two layers of the transparent film include at least one layer containing an inorganic compound and at least one layer containing an organic compound.

15. The liquid crystal display device as set forth in claim 1, wherein the transparent film has a total film thickness of not less than about 1.5 μm.

16. The liquid crystal display device as set forth in claim 1, wherein the transparent film has a total film thickness of not less than about 1.7 μm.

17. The liquid crystal display device as set forth in claim 1, wherein each of the at least two layers of the transparent film has a film thickness of not more than about 4 μm.

18. The liquid crystal display device as set forth in claim 1, wherein the transparent film has a total film thickness of not less than about 1.5 μm but not more than about 4 μm.

19. The liquid crystal display device as set forth in claim 1, wherein the transparent film has a total film thickness of not less than about 2 μm but not more than about 4 μm.

20. The liquid crystal display device as set forth in claim 1, wherein the portion of the surface of the first substrate that the light blocking section is provided is opposed to the second substrate and is located below a boundary between the sealing member and the liquid crystal layer, and the transparent film is disposed at least between a portion at which the sealing member makes contact with the liquid crystal layer and the light blocking section.

21. The liquid crystal display device as set forth in claim 1, wherein the light blocking section is at least one selected from a group consisting of a metal wire, a dummy pattern made of a metal, and a black matrix.

22. The liquid crystal display device as set forth in claim 1, wherein the color filter substrate is provided with a light blocking section arranged such that at least a portion of the light blocking section of the color filter substrate overlaps with the sealing member.

23. The liquid crystal display device as set forth in claim 1, wherein a film thickness of the transparent film from a base portion of the light blocking section is as high as or higher than a height of a light-blocked region from the base portion of the light blocking section, which light-blocked region is a region in which light coming via a backside surface of the array substrate is blocked by the light blocking section.

24. The liquid crystal display device as set forth in claim 23, wherein the light blocking section is arranged to protrude from a portion of a border between the liquid crystal layer and the sealing member into an area in which the sealing member is located when viewed from above.

25. The liquid crystal display device as set forth in claim 23, wherein the light blocking section includes a photocurable material.

26. A liquid crystal display device, comprising:
an array substrate and a color filter substrate arranged to face each other;
a liquid crystal layer provided between the array substrate and the color filter substrate;
a sealing member arranged to continuously surround the liquid crystal layer and arranged to join the array substrate and the color filter substrate together;
a light blocking section provided in a portion of a surface of the array substrate; and
a transparent film provided on the array substrate and between the sealing member and the light blocking section; wherein
the transparent film includes at least two layers made of different materials, each of the at least two layers are disposed between the sealing member and the light blocking section; and
Formula (2) is satisfied where the light blocking section has a width W, the transparent film is made up of m layers (1<m), a k-th layer of the transparent film counted from a side in which the array substrate is provided has a refractive index of $n_k$ ($1 \leq k \leq m$), and the k-th layer has a film thickness $d_k$:

$$W \leq \sum_{k=1}^{m} 2 \times d_k \times \sqrt{\frac{0.88}{n_k^2 - 0.88}}. \quad (2)$$

* * * * *